(12) United States Patent
Hellman et al.

(10) Patent No.: US 9,903,241 B2
(45) Date of Patent: Feb. 27, 2018

(54) SMALL AIR-COOLED ENGINE ASSEMBLY WITH DRY SUMP LUBRICATION SYSTEM

(71) Applicant: Briggs & Stratton Corporation, Wauwatosa, WI (US)

(72) Inventors: Adam J. Hellman, Bayside, WI (US); John Schneiker, Muskego, WI (US); Tim Kwiatkowski, Muskego, WI (US); Casey Groh, Shorewood, WI (US); Robert Price, Wauwatosa, WI (US); Ryan Sullivan, West Bend, WI (US); Gary Johnson, Hales Corners, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 15/295,294

(22) Filed: Oct. 17, 2016

(65) Prior Publication Data
US 2017/0138232 A1    May 18, 2017

Related U.S. Application Data

(60) Provisional application No. 62/255,227, filed on Nov. 13, 2015, provisional application No. 62/335,500, filed on May 12, 2016.

(51) Int. Cl.
*F01M 1/10* (2006.01)
*F01M 11/00* (2006.01)
(Continued)

(52) U.S. Cl.
CPC .............. *F01M 1/10* (2013.01); *A01D 69/00* (2013.01); *F01M 1/12* (2013.01);
(Continued)

(58) Field of Classification Search
CPC .. F01M 1/02; F01M 1/10; F01M 1/12; F01M 11/12; F01M 11/0004; F01M 11/06;
(Continued)

(56) References Cited

U.S. PATENT DOCUMENTS 2,322,463 A * 6/1943 McDonald ................ F16N 7/40
184/6.13
4,151,823 A * 5/1979 Grosse .................... F01M 11/03
123/196 A
(Continued)

FOREIGN PATENT DOCUMENTS

DE   10 2006 017 924 A1   10/2007
EP        0 752 518 A1    1/1997
(Continued)

OTHER PUBLICATIONS

English machine translation of JP 62165016 A provided by ESPACENET.*
(Continued)

*Primary Examiner* — Jacob Amick
*Assistant Examiner* — Michael A Kessler
(74) *Attorney, Agent, or Firm* — Foley & Lardner LLP

(57) ABSTRACT

An engine assembly includes an engine, an external oil reservoir, a supply pump, and a return pump. The engine includes an oil gallery configured to distribute oil and a crankcase chamber. The external oil reservoir includes an oil tank defining an oil chamber and an oil filter assembly including a housing at least partially defining a filter chamber, and a filter positioned within the filter chamber. The supply pump is in fluid communication with the oil chamber and the oil gallery and the supply pump is configured to draw oil from the oil chamber and provide pressurized oil to the oil gallery. The return pump in fluid communication with the crankcase chamber and the filter chamber and the return (Continued)

pump is configured to draw oil from the crankcase chamber and provide pressurized oil to the filter chamber.

17 Claims, 26 Drawing Sheets

(51) Int. Cl.
*A01D 69/00* (2006.01)
*F02F 7/00* (2006.01)
*F01M 1/12* (2006.01)
*A01D 101/00* (2006.01)
*F01M 11/04* (2006.01)

(52) U.S. Cl.
CPC ....... *F01M 11/0004* (2013.01); *F02F 7/0039* (2013.01); *F02F 7/0068* (2013.01); *A01D 2101/00* (2013.01); *F01M 2001/1071* (2013.01); *F01M 2001/1092* (2013.01); *F01M 2001/123* (2013.01); *F01M 2001/126* (2013.01); *F01M 2011/0083* (2013.01); *F01M 2011/0491* (2013.01)

(58) Field of Classification Search
CPC . F01M 2001/02027; F01M 2001/0238; F01M 2001/0246; F01M 2001/0253; F01M 2001/0261; F01M 2001/0289; F01M 2001/1071; F01M 2001/1078; F01M 2001/123; F01M 2001/126; F01M 2011/0029; F01M 2011/007; F01M 2011/0083; F01M 2011/035; F01M 2011/0491; F16N 13/20; F16N 19/003; F02F 7/0039; B63H 21/386
USPC ........ 123/196 A, 196 R; 184/6.13; 440/88 L; 210/167.02, 416.5
See application file for complete search history.

(56) References Cited

U.S. PATENT DOCUMENTS

| | | | |
|---|---|---|---|
| 4,353,163 A * | 10/1982 | Overbury | B27B 17/12 137/543.13 |
| 4,681,189 A | 7/1987 | Krisiloff | |
| 4,724,806 A | 2/1988 | Hartwig | |
| RE32,620 E | 3/1988 | Iwai | |
| 4,903,654 A | 2/1990 | Sato et al. | |
| 5,031,591 A | 7/1991 | Shinoda et al. | |
| 5,568,842 A | 10/1996 | Otani | |
| 5,634,832 A | 6/1997 | Nakase et al. | |
| 5,755,194 A | 5/1998 | Moorman et al. | |
| 5,979,392 A | 11/1999 | Moorman et al. | |
| 6,032,635 A | 3/2000 | Moorman et al. | |
| 6,230,680 B1 | 5/2001 | Pirone | |
| 6,305,342 B1 | 10/2001 | Narita et al. | |
| 6,459,995 B1 * | 10/2002 | Collister | G01N 33/2888 702/104 |
| 6,524,149 B1 | 2/2003 | Hattori | |
| 6,679,692 B1 | 1/2004 | Feuling | |
| 7,017,546 B1 | 3/2006 | Patel et al. | |
| 7,162,991 B2 | 1/2007 | White et al. | |
| 7,174,876 B2 | 2/2007 | Suzuki et al. | |
| 7,188,601 B1 | 3/2007 | Trease | |
| 7,219,645 B2 | 5/2007 | Lamb et al. | |
| 7,290,995 B2 | 11/2007 | Ohnishi et al. | |
| 8,028,672 B2 | 10/2011 | Prior et al. | |
| 8,910,610 B2 | 12/2014 | Thayer | |
| 2009/0173580 A1 | 7/2009 | Papas | |

FOREIGN PATENT DOCUMENTS

| | | | |
|---|---|---|---|
| EP | 1 199 447 A1 | 4/2002 | |
| EP | 1 201 883 A2 | 5/2002 | |
| JP | 62165016 A * | 7/1987 | ............... F16C 3/14 |
| JP | 2008115727 A * | 5/2008 | ............ F01M 11/00 |
| WO | WO-1995/20099 | 7/1995 | |

OTHER PUBLICATIONS

English machine translation of JP 2008115727 A provided by ESPACENET.*
International Search Report and Written Opinion, PCT/US2016/058909, Briggs & Stratton Corporation, 12 pages (dated Jan. 31, 2017).

* cited by examiner

SMALL AIR-COOLED ENGINE ASSEMBLY WITH DRY SUMP LUBRICATION SYSTEM

CROSS-REFERENCE TO RELATED APPLICATIONS

This application claims the benefit of U.S. Provisional Patent Application No. 62/335,500, filed May 12, 2016 and U.S. Provisional Patent Application No. 62/255,227, filed Nov. 13, 2015, both of which are incorporated herein by reference in their entireties.

BACKGROUND

The present invention relates generally to the fields of small internal combustion engines and outdoor power equipment, and in particular, engine assemblies including small internal combustion engines and dry sump lubrication systems, external oil reservoirs for use with dry sump lubrication systems, oil filters for use with dry sump lubrication systems, and outdoor power equipment including dry sump lubrication systems.

SUMMARY

One embodiment of the invention relates to an engine assembly including an engine, an external oil reservoir, a supply pump, and a return pump. The engine includes an engine block, an oil gallery configured to distribute oil, a crankcase cover, and a crankcase chamber defined by the engine block and the crankcase cover. The external oil reservoir includes an oil tank defining an oil chamber and an oil filter assembly including a housing at least partially defining a filter chamber, wherein the filter chamber is in fluid communication with the oil chamber, and a filter positioned within the filter chamber. The supply pump is in fluid communication with the oil chamber and the crankcase chamber and the supply pump is configured to draw oil from the oil chamber and provide pressurized oil to the oil gallery. The return pump in fluid communication with the crankcase chamber and the filter chamber and the return pump is configured to draw oil from the crankcase chamber and provide pressurized oil to the filter chamber. The filter is configured to filter the pressurized oil provided to the filter chamber. In some embodiments, the engine assembly is a component of a lawn mower. In different embodiments, the lawn mower is a riding lawn mower, a wide-area walk-behind lawn mower, a zero-turn radius lawn mower, or a standing lawn mower.

Another embodiment of the invention relates to an engine assembly including a small air-cooled engine and an external oil reservoir. The small air-cooled engine includes an engine block, a crankcase cover, and a crankcase chamber defined by the engine block and the crankcase cover. The external oil reservoir includes an oil tank defining an oil chamber. The crankcase chamber and the oil chamber are sized to provide at least five hundred hours of engine oil life.

Another embodiment of the invention relates to an engine assembly including a small air-cooled engine and a dry sump lubrication system. In some embodiments, the dry sump lubrication system includes an external oil reservoir and has an overall oil capacity that provides at least five hundred hours of engine oil life. In some embodiments, the engine assembly is a component of a lawn mower. In different embodiments, the lawn mower is a riding lawn mower, a wide-area walk-behind lawn mower, a zero-turn radius lawn mower, or a standing lawn mower.

Another embodiment of the invention relates to an engine assembly including a small air-cooled engine and an external oil reservoir. The small air-cooled engine includes an engine block, a crankcase cover, and a crankcase chamber defined by the engine block and the crankcase cover, the crankcase chamber having a crankcase volume. The external oil reservoir includes an oil tank defining an oil chamber, the oil chamber having a reservoir volume. The reservoir volume is greater than the crankcase volume. In some embodiments, the crankcase volume and the reservoir volume have an overall oil capacity that provides at least 500 hours of engine oil life. In some embodiments, the reservoir volume is at least five quarts. In some embodiments, the reservoir volume is greater than five quarts and a recommended oil fill capacity of the oil chamber is five quarts. In some embodiments, the engine assembly is a component of a lawn mower. In different embodiments, the lawn mower is a riding lawn mower, a wide-area walk-behind lawn mower, a zero-turn radius lawn mower, or a standing lawn mower.

Another embodiment of the invention relates to an external oil reservoir for use with an internal combustion engine including an oil tank defining an oil chamber and an oil filter assembly. The oil filter assembly includes a housing at least partially defining a filter chamber, wherein the filter chamber is in fluid communication with the oil chamber, a filter positioned within the filter chamber, and a return inlet in fluid communication with the filter chamber to provide oil returned from the internal combustion engine to the filter chamber to be filtered by the filter. In some embodiments, the external oil reservoir is a component of a lawn mower. In different embodiments, the lawn mower is a riding lawn mower, a wide-area walk-behind lawn mower, a zero-turn radius lawn mower, or a standing lawn mower.

Another embodiment of the invention relates to an external oil reservoir for use with an internal combustion engine including an oil tank defining an oil chamber and an oil filter assembly including a filter and a return inlet configured to provide oil returned from the internal combustion engine to the filter for filtration. In some embodiments, the external oil reservoir is a component of a lawn mower. In different embodiments, the lawn mower is a riding lawn mower, a wide-area walk-behind lawn mower, a zero-turn radius lawn mower, or a standing lawn mower.

Another embodiment of the invention relates to an engine assembly including an internal combustion engine and an oil tank. The engine includes at least one cylinder, a crankcase chamber, a vertical crankshaft extending through the crankcase chamber, the crankshaft configured to rotate about a vertical crankshaft axis, a supply pump including a supply inlet and a supply outlet, an oil gallery in fluid communication with the supply outlet, the oil gallery configured to distribute oil within the engine, and a return pump including an return inlet and a return outlet, wherein the return inlet is in fluid communication with a front portion of the crankcase chamber and wherein the return pump is configured to draw oil from the front portion of the crankcase chamber through the return inlet into the return pump. The oil tank defines an oil chamber and includes a filter positioned within a filter chamber. The return outlet is in fluid communication with the filter chamber and the return pump is configured to pump oil from the front portion of the crankcase chamber to the filter chamber to be filtered by the filter. The filter chamber is in fluid communication with the oil chamber so that filtered oil passes from the filter to the oil chamber. The supply inlet is in fluid communication with the oil chamber and the supply pump is configured to pump oil from the oil chamber to the oil gallery. In some embodiments, the return pump is configured to pump oil to the filter chamber under a first pressure and pressurize the oil chamber and the supply pump is configured to draw oil from the oil chamber under a vacuum and provide oil to the oil gallery under a second pressure. In some embodiments, the first pressure is less than 15 pounds per square inch (1.034e+005 newtons/square meter). In some embodiments, the second pressure is greater than 30 pounds per square inch (2.068e+005 newtons/square meter). In some embodiments, the return pump pumps oil at a lower output pressure than the supply pump. In some embodiments, the engine assembly is a component of a lawn mower. In different embodiments, the lawn mower is a riding lawn mower, a wide-area walk-behind lawn mower, a zero-turn radius lawn mower, or a standing lawn mower.

Another embodiment of the invention relates to an internal combustion engine for use with an external oil reservoir. The engine includes at least one cylinder, a crankcase chamber, a vertical crankshaft extending through the crankcase chamber, the crankshaft configured to rotate about a vertical crankshaft axis, a supply pump including a supply inlet and a supply outlet, the supply pump configured to receive oil from the external oil reservoir via the supply inlet, an oil gallery in fluid communication with the supply outlet to receive oil from the supply pump, the oil gallery configured to distribute oil within the engine, and a return pump including an return inlet and a return outlet, wherein the return inlet is in fluid communication with a front portion of the crankcase chamber and wherein the return pump is configured to draw oil from the front portion of the crankcase chamber through the return inlet into the return pump. In some embodiments, the engine is a component of a lawn mower. In different embodiments, the lawn mower is a riding lawn mower, a wide-area walk-behind lawn mower, a zero-turn radius lawn mower, or a standing lawn mower.

Another embodiment of the invention relates to an oil filter for use with an oil reservoir. The oil filter includes a top including a fill inlet comprising a screen having a plurality of openings, a bottom including a filter outlet, an oil fill conduit extending between the top and the bottom and in fluid communication with the fill inlet and the filter outlet, and filter media surrounding the oil fill conduit and positioned between the top and the bottom. The filter is configured so that oil passes through the openings of the screen of the fill inlet, the oil fill conduit, and the filter outlet without being filtered by the filter media. In some embodiments, the top includes a quick connect fitting configured to secure the oil filter to the oil reservoir.

Another embodiment of the invention relates to riding outdoor power equipment including an internal combustion engine and an oil reservoir. The engine includes an engine block including a first cylinder and a second cylinder arranged in a V-twin configuration, a first cylinder head for the first cylinder, and a second cylinder head for the second cylinder, wherein the first cylinder head and the second cylinder head are located at a front of the engine opposite a rear of the engine. The oil reservoir is configured for storing oil and at least a portion of the oil reservoir is located between the rear of the engine and the first cylinder head. In some embodiments, at least a second portion of the oil reservoir is located between the rear of the engine and the second cylinder head. In some embodiments, the riding outdoor power equipment also includes an operator seat and the top of the oil reservoir is located below the top of the seat. In some embodiments, at least a portion of the oil reservoir is positioned between the seat and the internal combustion engine. In some embodiments, the entire oil reservoir is positioned between the seat and the internal combustion engine. In some embodiments, the outdoor power equipment also includes a roll bar including two upwardly extending legs, wherein the oil reservoir is positioned between the two legs of the roll bar.

Another embodiment of the invention relates to outdoor power equipment including an internal combustion engine and an oil reservoir. The engine includes an engine block including a first cylinder and a second cylinder arranged in a V-twin configuration, a first cylinder head for the first cylinder, and a second cylinder head for the second cylinder, wherein the first cylinder head and the second cylinder head are located at a front of the engine opposite a rear of the engine. The oil reservoir is configured for storing oil and at least a portion of the oil reservoir is located between the rear of the engine and the first cylinder head. In some embodiments, at least a second portion of the oil reservoir is located between the rear of the engine and the second cylinder head. In some embodiments, the outdoor power equipment is a lawn mower. In different embodiments, the lawn mower is a riding lawn mower, a wide-area walk-behind lawn mower, a zero-turn radius lawn mower, or a standing lawn mower.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
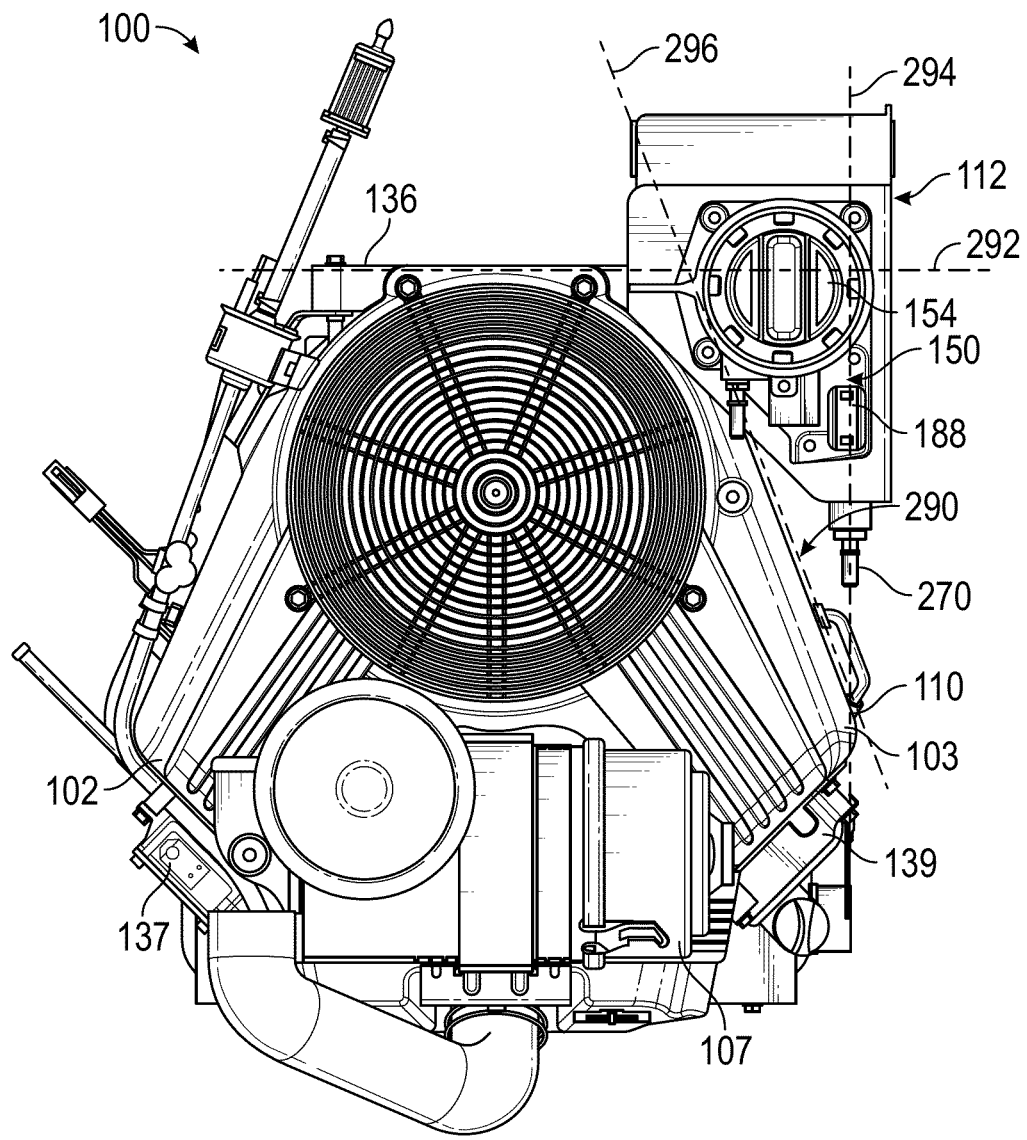
FIG. 1 is a top view of an engine assembly including an engine and an external oil reservoir, according to an exemplary embodiment.
Figure 2:
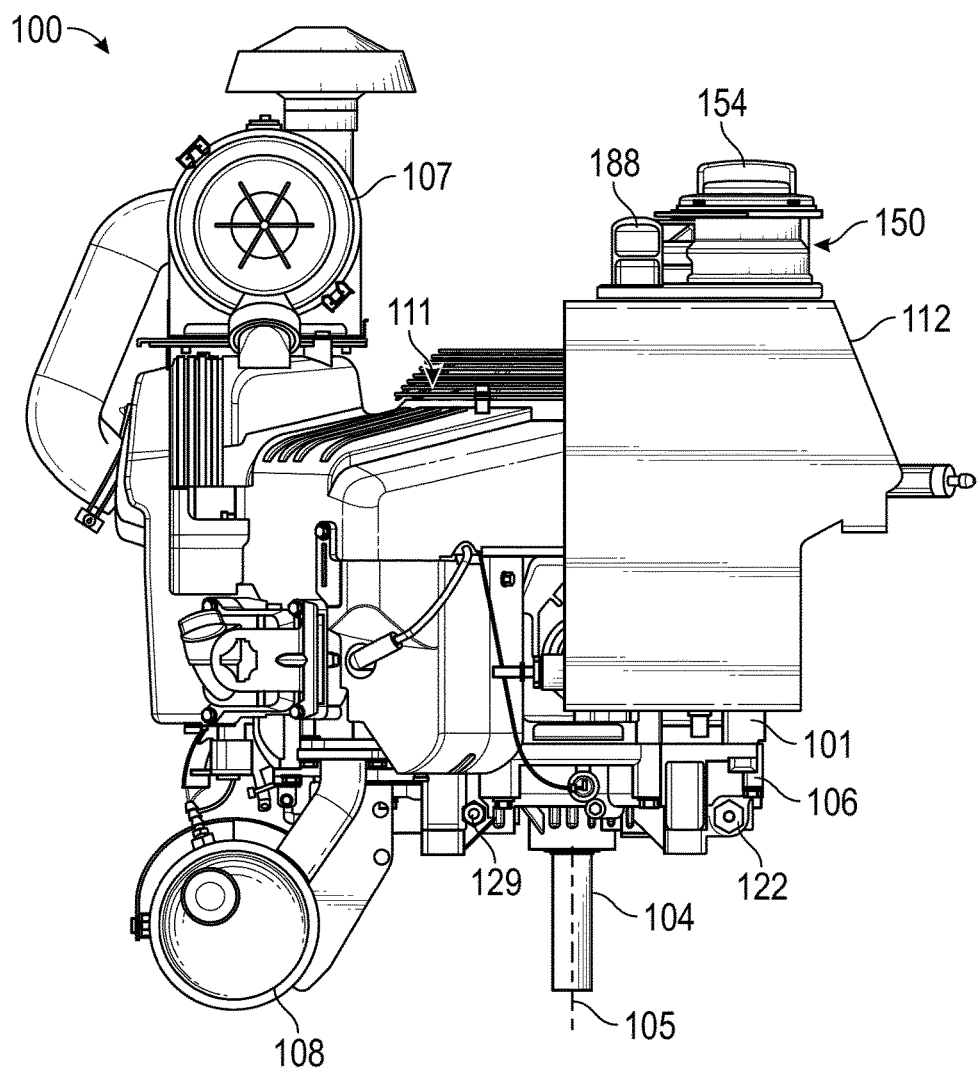
FIG. 2 is a side view of the engine assembly of FIG. 1.

Referring to FIGS. 1-2, an engine assembly including an internal combustion engine 100 and an external oil tank or reservoir 112 is illustrated according to an exemplary embodiment. The internal combustion engine 100 includes an engine block 101 having two cylinders 102 and 103, two cylinder heads 137 and 139, two pistons, and a crankshaft 104. Each piston reciprocates in a cylinder along a cylinder axis to drive the crankshaft 104. The crankshaft 104 rotates about a crankshaft axis 105. The crankshaft 104 is positioned in part within a crankcase chamber 130 defined by the engine block 101 and a sump or crankcase cover 106. The engine 100 also includes a fuel system for supplying an air-fuel mixture to the cylinder (e.g., a carburetor, an electronic fuel injection system, a fuel direct injection system, etc.), an air filter assembly 107, a camshaft 119 for actuating intake and exhaust valves in the cylinder heads, a muffler 108, a flywheel, and a blower fan. The engine 100 includes a blower housing 110 configured to direct cooling air over the engine block 101 and other components of the engine. The blower fan pulls air into the blower housing 110 through an air inlet. The crankshaft 104 may be oriented horizontally (i.e., a horizontal engine) or vertically (i.e., a vertical engine). The engine may include one cylinder or two or more cylinders. The illustrated engine 100 is a vertically-shafted two cylinder engine arranged in a V-twin configuration.

The engine assembly may be used in outdoor power equipment, standby generators, portable jobsite equipment, or other appropriate uses. Outdoor power equipment includes lawn mowers, riding tractors, snow throwers, pressure washers, portable generators, tillers, log splitters, zero-turn radius mowers, walk-behind mowers, wide-area walk-behind mowers, riding mowers, standing mowers, industrial vehicles such as forklifts, utility vehicles, etc. Outdoor power equipment may, for example, use an internal combustion engine to drive an implement, such as a rotary blade of a lawn mower, a pump of a pressure washer, an auger of a snow thrower, the alternator of a generator, and/or a drivetrain of the outdoor power equipment. Portable jobsite equipment includes portable light towers, mobile industrial heaters, and portable light stands.

Figure 3:
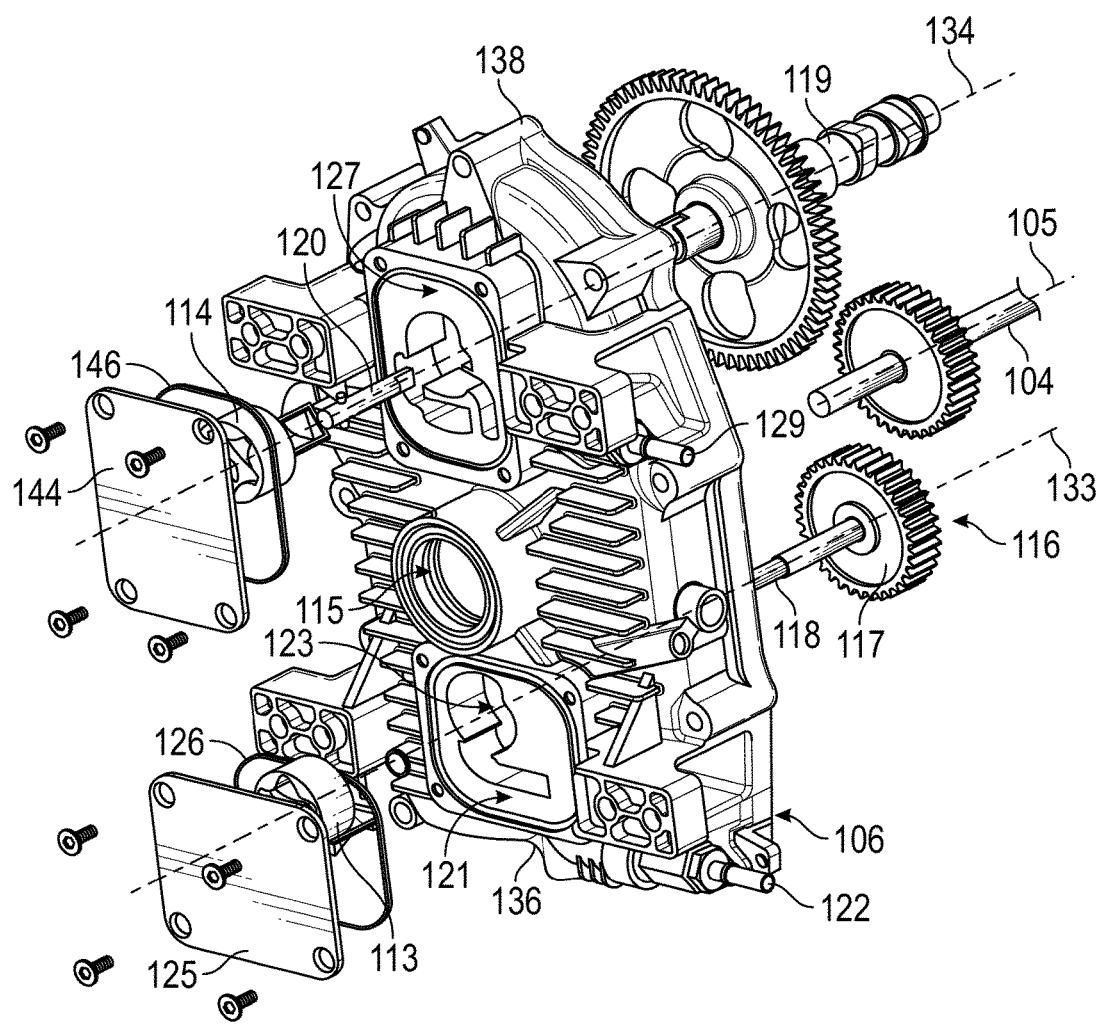
FIG. 3 is an exploded view of the crankcase cover of the engine of FIG. 1.
Figure 4:
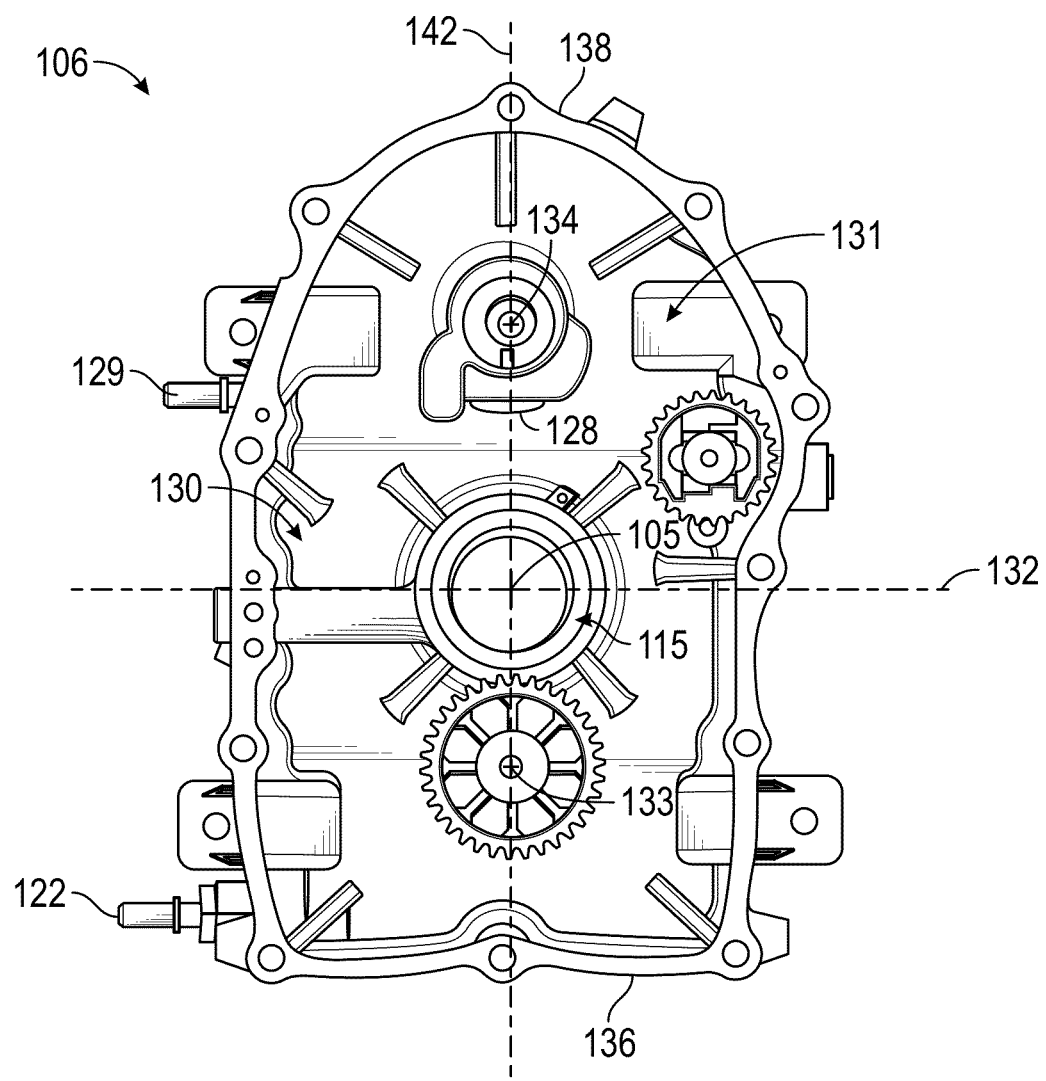
FIG. 4 is a top view of the crankcase cover of FIG. 3.

Referring to FIGS. 2-4, the engine 100 includes a dry sump lubrication system that includes the external oil tank 112 (FIG. 2), a supply pump 113 (FIG. 3) for supplying oil (lubricant) from the tank 112 to the engine via oil galleries for distribution to various locations within the engine 100, a return or scavenge pump 114 (FIG. 4) for returning (scavenging) oil from the crankcase chamber 130 to the tank 112, and the conduits (hoses, tubes, other plumbing) for fluidly connecting the tank 112, the pumps 113, 114, the oil galleries 124, and the crankcase chamber 130 to one another.

The oil tank 112 is sized to hold oil sufficient to extend the engine oil life for a commercial lawn mower (e.g., a zero-turn lawn mower, standing mowers, etc.) to 500 plus hours. Typical commercial lawn mower best practice is to assume 100 hours of engine oil life for a conventional engine without an external oil tank and routinely change the engine oil after 100 hours of engine operation. Providing at least 500 hours of engine oil life with the dry sump system described herein enables operation of the lawn mower (e.g., operated by a commercial lawn services provider) for an entire summer mowing season without having to change the oil, thereby reducing downtime and maintenance during the season in which the mower will be operated. The dry sump lubrication system described herein can reduce oil change labor and replacement filter costs by at least 60%. In exemplary embodiments of the dry sump system described herein about 5-6 quarts (about 4.732-5.678 liters) of oil is sufficient to provide at least 500 hours of engine oil life. In other embodiments, more or less oil may be sufficient to provide at least 500 hours of engine oil life depending on the particular arrangement of the engine used with the dry sump system. The dry sump system extends engine oil life as compared to an engine that does not include an external oil tank.

Engine oil life is a measure of the operation time of an engine between recommended oil changes. During operation of an engine, the oil used to lubricate and cool the engine breaks down. Engine oil break down is due in part to heat and mechanical shearing of the hydrocarbons that make up the oil. Also, the oil may accumulate particles (e.g., metal particles worn off engine components) that negatively impact the oil's viscosity. Finally, oil contains a number of additives called an additive package, including for example anti-foaming, detergent, viscosity modifiers, and anti-corrosion additives, that help the oil perform to manufacturer and industry standards (e.g., American Petroleum Institute or Society of Automotive Engineer ("SAE") standards). These additives are basic in nature and can be identified by the total base number ("TBN"). TBN is used as a measure of reserve alkalinity in the oil. As the engine operates the total acid number ("TAN") increases from a value of zero and the TBN decreases. TAN is used as a measure of acid concentration in the oil. As the engine operates, the additive package loses effectiveness.

As the engine oil breaks down, its viscosity increases so that the oil may appear thick, sludgy, or dirty in comparison to new oil. Manufacturers (e.g., engine manufacturers and equipment manufacturers) determine the engine oil life or recommended oil change intervals for particular lubrication systems. Signs that engine oil life for a particular lubrication system has been exceeded and an oil change should occur are when the TBN and TAN begin to approach one another (e.g., within 5%-10% of the same value) or when the TAN is greater than the TBN. Oxidation of the oil can also be measured as a way of determining engine oil life for a particular lubrication system. The viscosity of oil in a test engine can be measured as a way of determining engine oil life for a particular lubrication engine. For example, new oil measured at a rated viscosity of SAE 20 may be measured at a rated viscosity of SAE 50 after a period of operation in a test engine. This change in viscosity can be used to establish the engine oil life. Visual inspection of a test engine can also be used as a way of determining engine oil life for a particular lubrication system by evaluating the components of a test engine for signs of wear (e.g., worn bearings), by evaluating the appearance of the oil itself (e.g., dirty or dark oil), measuring the presence of wear metals in the oil (e.g., aluminum, iron, nickel, silicon, etc).

FIGS. 3-4 illustrate the sump or crankcase cover 106 according to an exemplary embodiment. The pumps 113 and 114 are incorporated into the crankcase cover 106. As illustrated, the pumps 113 and 114 are gerotor pumps. The crankcase cover 106 includes a crankshaft opening or aperture 115 through which the crankshaft 104 extends to drive one or more components of a lawn mower or other piece of equipment. A transmission 116 including one or more gears 117 or other reduction mechanism (e.g., belts) connects the crankshaft 104 to a drive shaft 118 for the supply pump 113 so the supply pump 113 is driven by the crankshaft 104 at a lower rotational speed than that of the crankshaft 104. The supply pump 113 and the drive shaft 118 rotate about an axis of rotation 133. The camshaft 119 is directly connected to a drive shaft 120 for the return pump 114 so the return pump 114 is directly driven by the camshaft 119 at the same rotational speed as the camshaft 119. The return pump 114 and the drive shaft 120 rotate about an axis of rotation 134. A transmission connects the camshaft 119 to the crankshaft 104 so that the camshaft 119 is driven at a rotational speed less than that that of the crankshaft 104.

The supply pump 113 and the return pump 114 are located near opposite sides of the crankcase cover 106. The supply pump 113 is located near the rear 136 of the crankcase cover 106 and the engine 100 and the return pump 114 is located near the front 138 of the crankcase cover 106 and the engine 100.

The supply pump 113 is positioned in a supply pump housing 121 formed in the exterior of the crankcase cover 106. The supply pump 113 is in fluid communication with a supply inlet 122 for receiving oil (e.g., supply oil) from the external oil tank 112 and a supply outlet 123 for providing oil for distribution within the engine 100 by one or more oil galleries 124. As illustrated, the supply inlet 122 includes a fitting for connecting a hose or other conduit to the supply pump 113. The supply pump 113 pumps oil to the oil gallery 124 to distribute oil within the engine. A cover plate 125 is secured to the crankcase cover 106 (e.g., by threaded fasteners) to close the pump housing 121. A gasket 126 is provided between the cover plate 125 and the crankcase cover 106 to form a seal.

The return pump 114 is positioned in a return pump housing 127 formed in the exterior of the crankcase cover 106. The return pump 114 is in fluid communication with a return inlet 128 for receiving oil (e.g., return oil, scavenged oil) from the crankcase chamber 130 and a return outlet 129 for providing oil to the external oil tank 112. As illustrated, the return outlet 129 includes a fitting for connecting a hose or other conduit to the return pump 114. A cover plate 144 is secured to the crankcase cover 106 (e.g., by threaded fasteners) to close the pump housing 127. A gasket 146 is provided between the cover plate 144 and the crankcase cover 106 to form a seal.

As shown in FIG. 4, the return inlet 128 is formed through the crankcase cover 106 to place the return pump 114 in fluid communication with the crankcase chamber 130. The return inlet 128 is formed in a front portion 131 of the crankcase cover 106 to be in fluid communication with the front portion of the crankcase chamber 130. The front portion 131 is located forward of a vertical plane 132 including the vertical crankshaft axis 105. The plane 132 is perpendicular to a second vertical plane 142 including the crankshaft axis 105 and the axis of rotation 134 of the return pump 114. The cylinders 102 and 103 and cylinder heads are also located forward of the vertical plane 132. The return pump 114 draws oil from the front portion 131 of the crankcase chamber 130 into the return pump 114. The return pump 114 pumps the oil to the external oil tank 112.

Figure 15A:
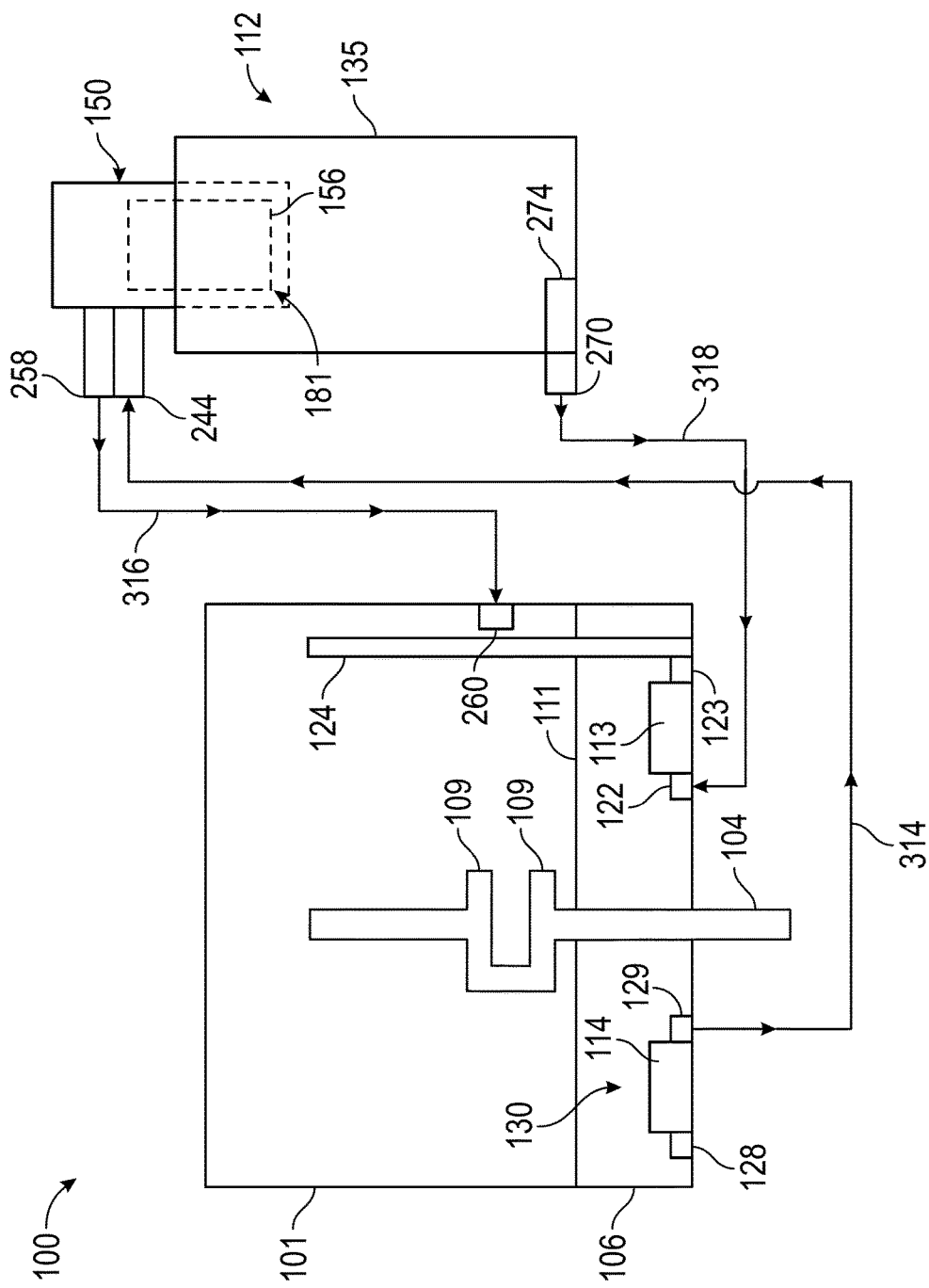
FIG. 15A is a schematic illustration of the engine assembly of FIG. 1.
Figure 15B:
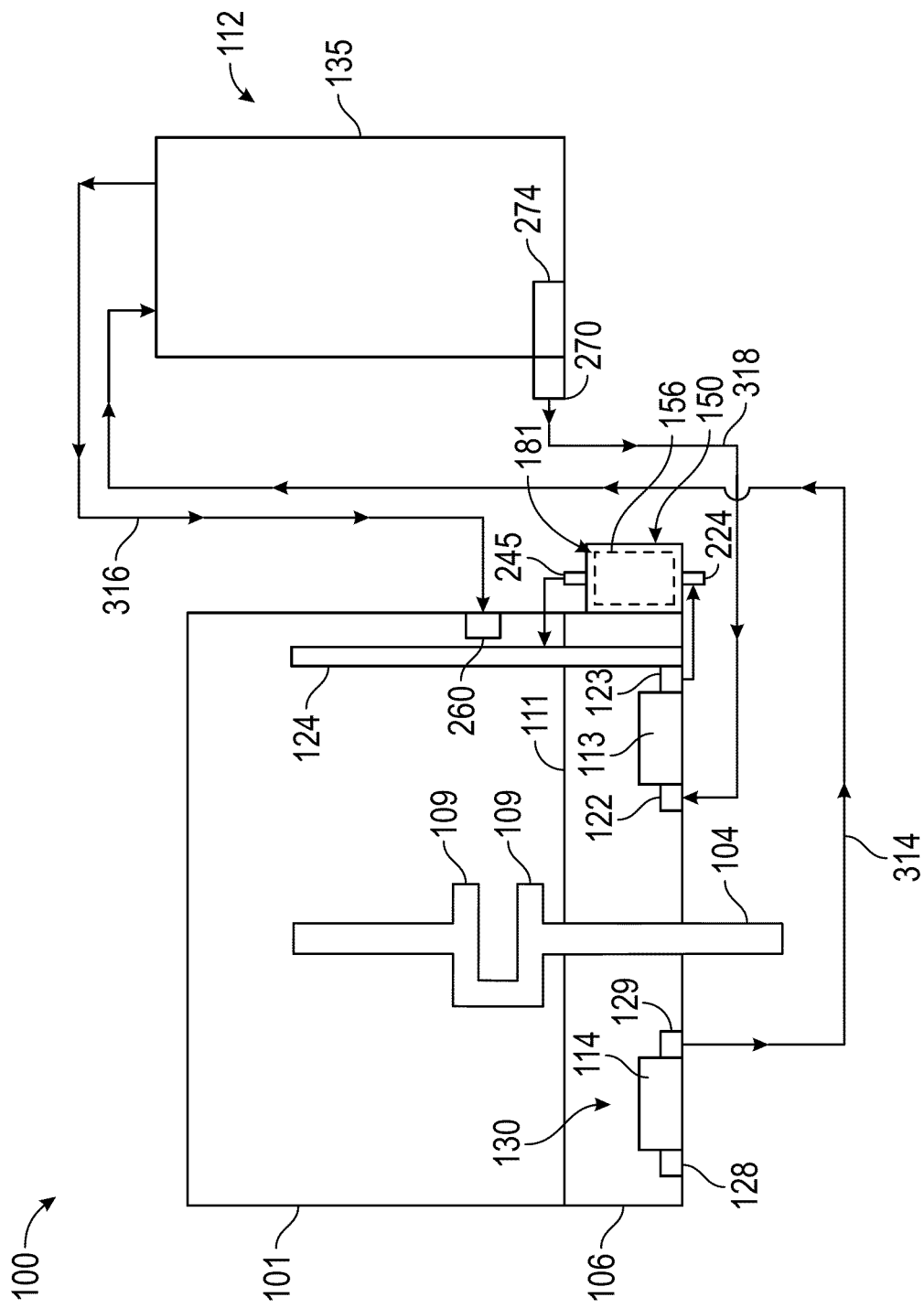
FIG. 15B is a schematic illustration of an engine assembly, according to an exemplary embodiment.

Locating the return inlet 128 near the front 138 of the engine 100 helps to ensure that sufficient oil is returned from the crankcase chamber 130 to the external oil tank 112 by the return pump 114 to prevent the engine 100 (i.e., crankcase chamber, cylinders, cylinder heads, oil galleries, etc.) from overfilling with oil supplied by the supply pump 113 from the external oil tank 112. When the lawn mower is tilted or tipped forward toward the front 138 (e.g., when traveling up or down a hill or incline), the oil in the crankcase chamber 130 moves toward the front portion 131 and the return inlet 128, which will reduces possible occurrences of the return pump 114 being starved for oil. If the return inlet 128 were located near the rear of the engine, this orientation would cause the oil to move away from the return inlet and possibly starve the return pump. When the return pump 114 has an insufficient or otherwise unavailable oil supply (is starved for oil), the engine 100 could overfill with oil as the supply of oil from the supply pump 113 outpaces the removal of oil by the return pump 114, potentially negatively impacting operation of the engine. Overfilling is a concern in part because the maximum volume of oil intended to be present in the engine 100 during normal operating conditions in the crankcase chamber (e.g., about 2.5 quarts-3 quarts (about 2.366 liters-2.839 liters)) is less than the volume of the external oil tank 112 (e.g., more than 5 quarts (4.732 liters)). When oil in excess of the intended maximum oil volume is present in the engine, the excess oil can impair operation of the engine (e.g., burning excess oil during combustion) and cause damage (e.g., damaging seals, gaskets, bearings, etc.). The crankshaft 104 includes one or more counterweights 109. As shown in FIGS. 15A-15B, it is preferred to keep the recommended oil level 111 in the crankcase chamber 130 below the level of the lowermost portion of the counterweights 109 of the crankshaft 104. When the oil level is at or above the level of the lowermost portion of the counterweights 109, this excess oil can be transferred to the combustion chamber of the cylinders 102, 103, where it is combusted and causes unwanted smoke during operation of the engine 100. Also the location of the return inlet 128 near the front 138 of the engine 100 helps the engine's performance when operated at an angle from the normal operating position shown in FIGS. 1 and 2. Angled operation of an engine is dependent on the engine's ability to handle excessive amounts of oil in particular locations (e.g., in the cylinders) and to prevent starving the return inlet 128 of the return pump 114 for oil. During tests performed by the Applicant, the engine 100 was able to operate when positioned at an angle of 45 degrees forward, 45 degrees rearward, 45 degrees to the left, or 45 degrees to the right relative to the normal operating illustrated in FIGS. 1-2 for a period of two minutes to simulate expected angled operation by a user and for a period of one hour to simulate an extreme example of angled operation by a user.

FIGS. 5-10 illustrate the external oil tank 112 of the engine 100 according an exemplary embodiment. The oil tank 112 includes a tank body 135 that defines an oil reservoir, volume, or chamber 148 for storing oil. The tank 112 may be formed from metal (e.g. aluminum) to provide advantageous heat transfer properties and/or contoured to maximize the surface area exposed to air to aid in cooling the oil stored in the chamber 148. In some embodiments, an oil cooler is provided to further cool the oil.

Figure 6:
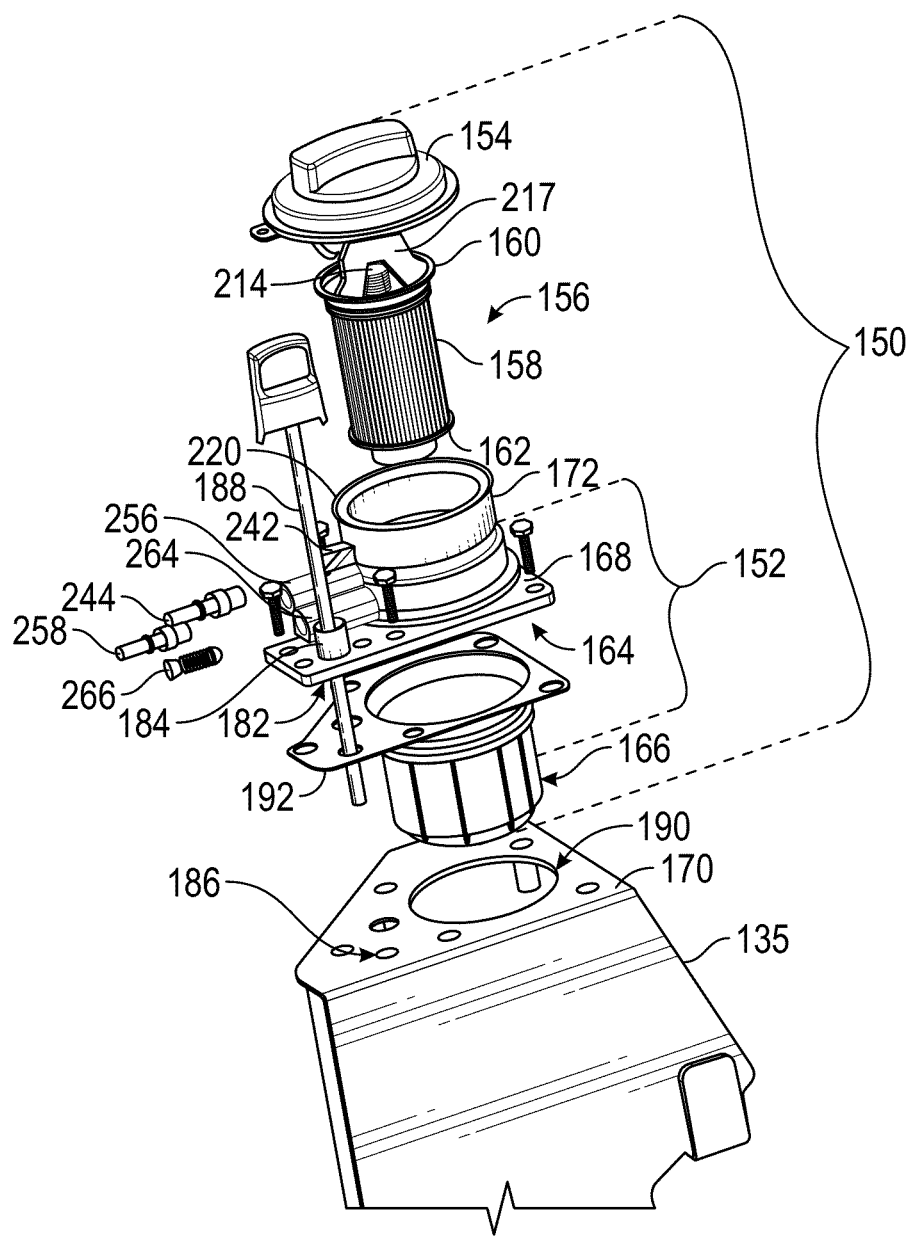
FIG. 6 is an exploded view of a portion of the oil reservoir of FIG. 5.
Figure 6A:
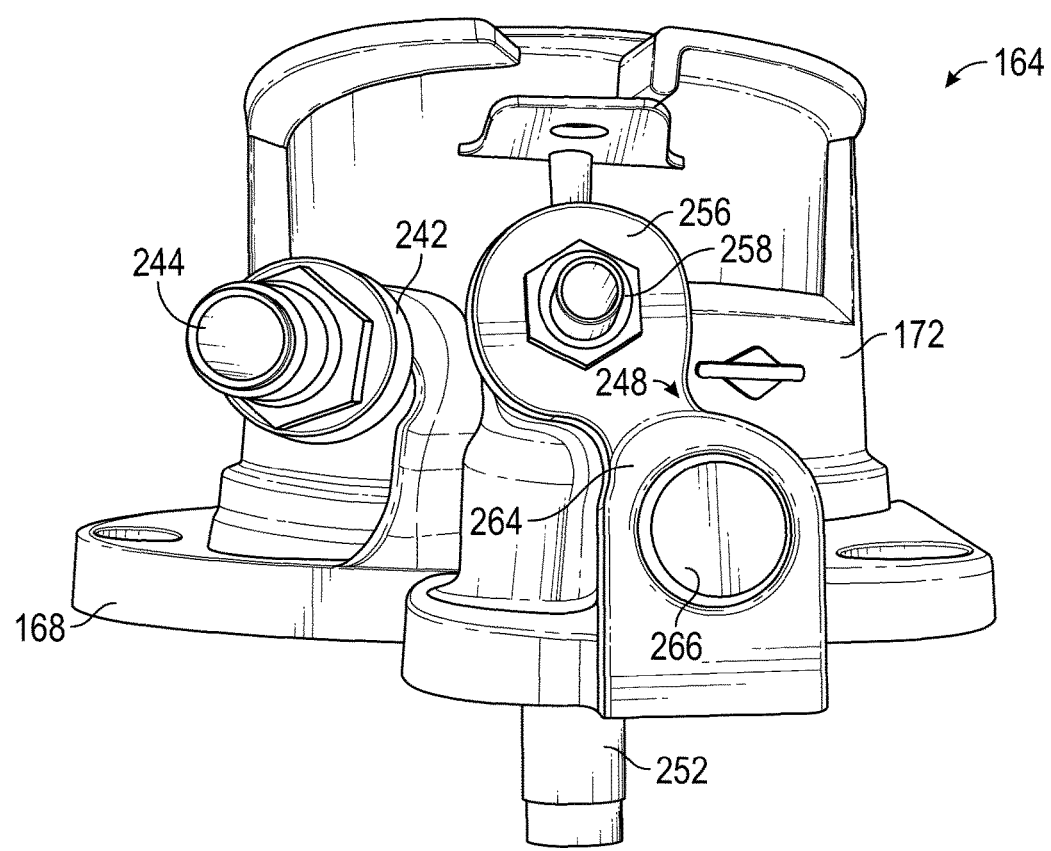
FIG. 6A is a front view of an upper portion of a filter housing of the oil reservoir of FIG. 5.

The external oil tank 112 includes an integrated oil filter assembly 150. FIG. 6 illustrates the oil filter assembly 150 according to an exemplary embodiment. The oil filter assembly 150 includes an oil filter housing 152, a cover or cap 154, and a filter 156. The filter 156 is a cylindrical cartridge including a cylinder of filter media or material 158 and two end caps 160 and 162.

The housing 152 includes an upper portion 164 and a lower portion 166. The upper portion 164 includes a mount or flange 168 for securing the housing 152 to the top 170 of the oil tank 112. The upper portion 164 also includes a substantially cylindrical filter body 172 extending upward from the flange 168. The lower portion 166 is substantially cup-shaped with a bottom 174 and a cylindrical sidewall 176. An opening or aperture 178 is formed through the bottom 174. A cylindrical neck or collar 180 extends downward from the bottom 174 around the opening 178. The lower portion 166 is attached to the upper portion 164 (e.g., by a threaded fastener, glue, adhesive, etc.) to form a filter chamber 181 for receiving the filter 156.

Figure 5:
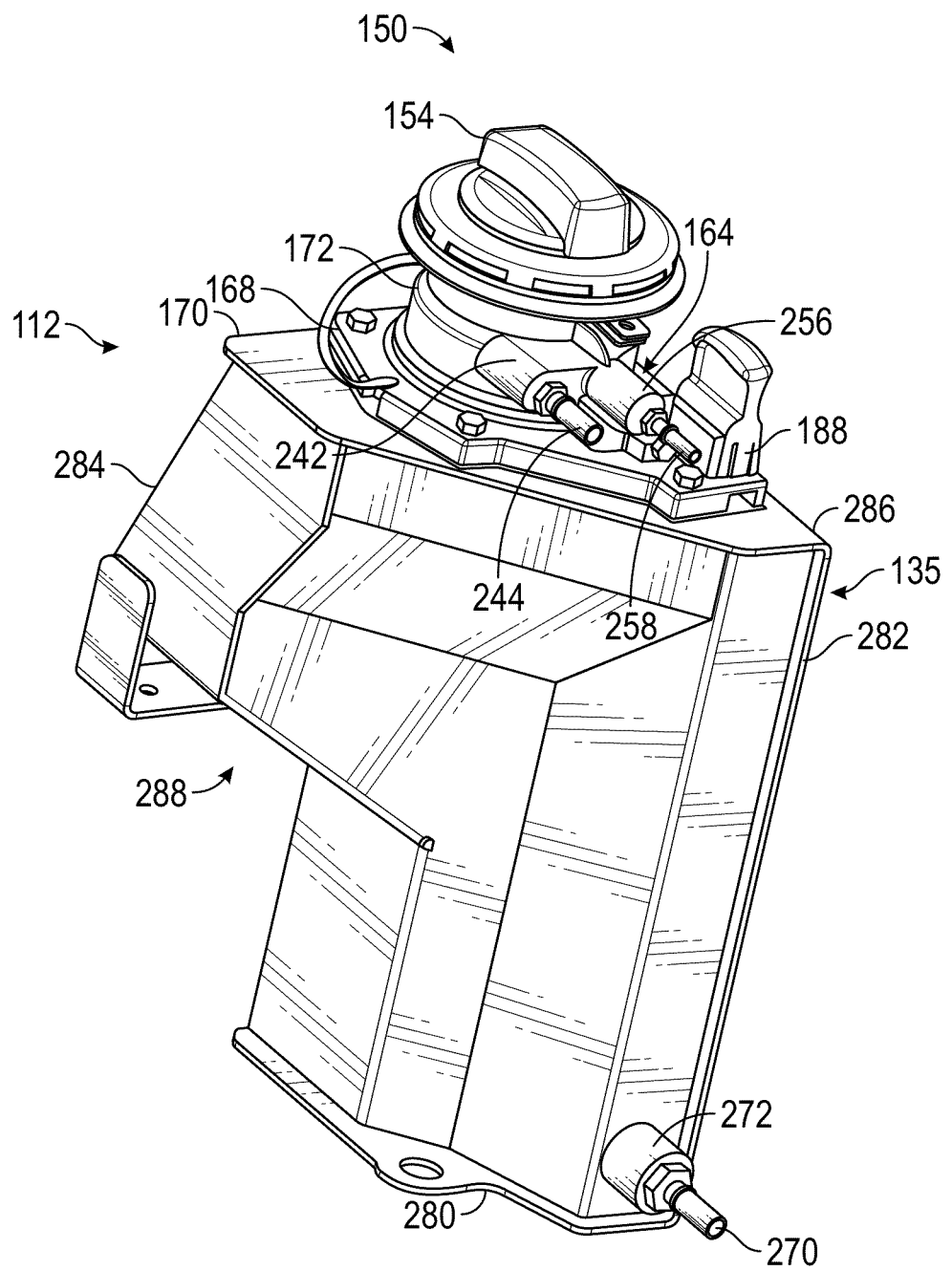
FIG. 5 is a perspective view of the oil reservoir of FIG. 1.
Figure 7:
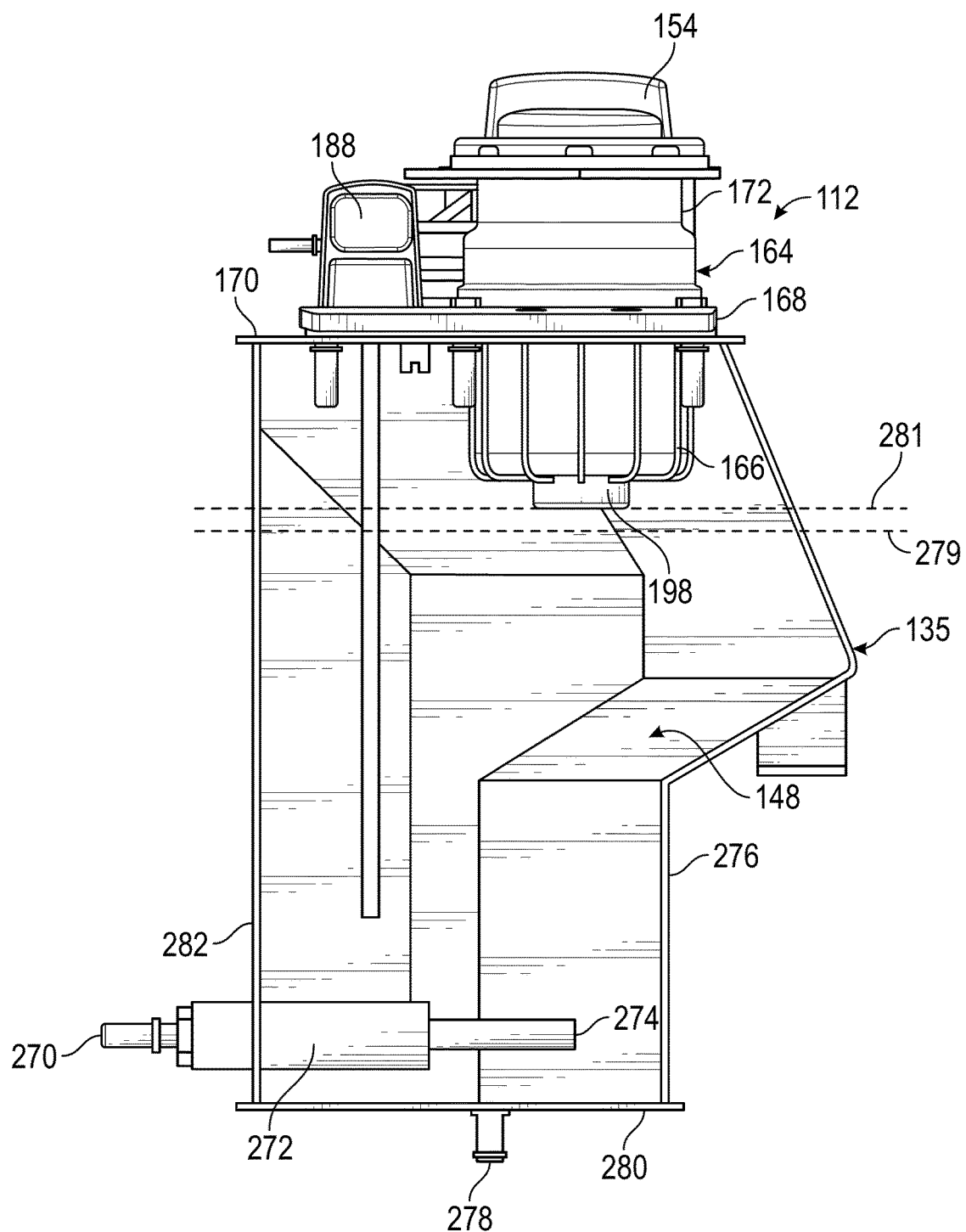
FIG. 7 is a section view of the oil reservoir of FIG. 5.
Figure 8:
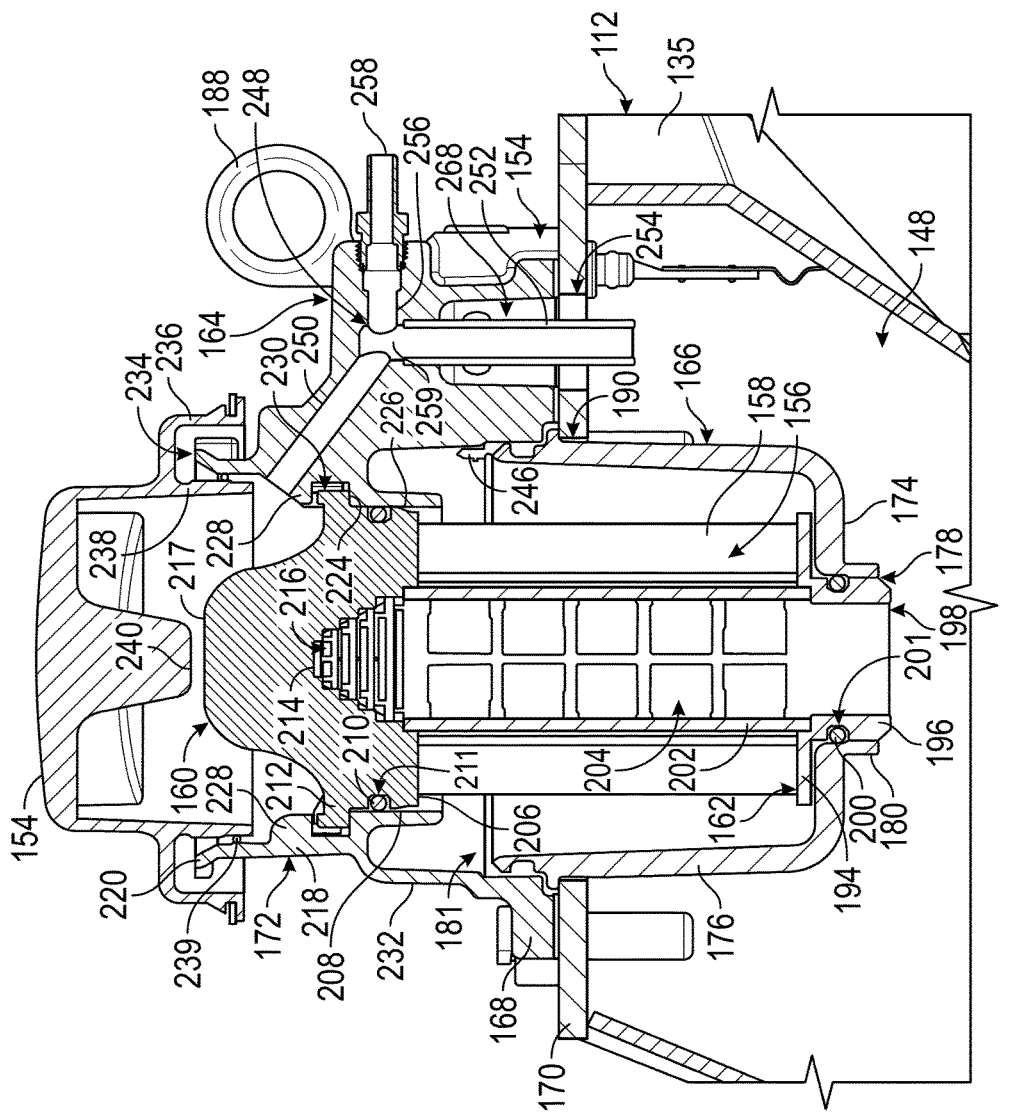
FIG. 8 is a section view of an oil filter assembly, according to an exemplary embodiment.
Figure 8A:
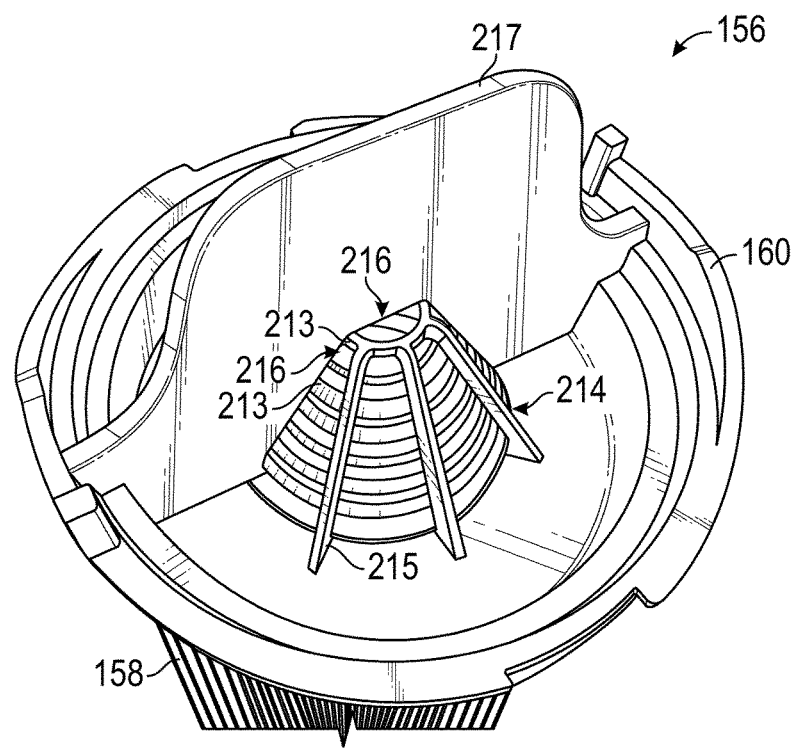
FIG. 8A is a perspective view of the filter of the oil filter assembly of FIG. 8.
Figure 8B:
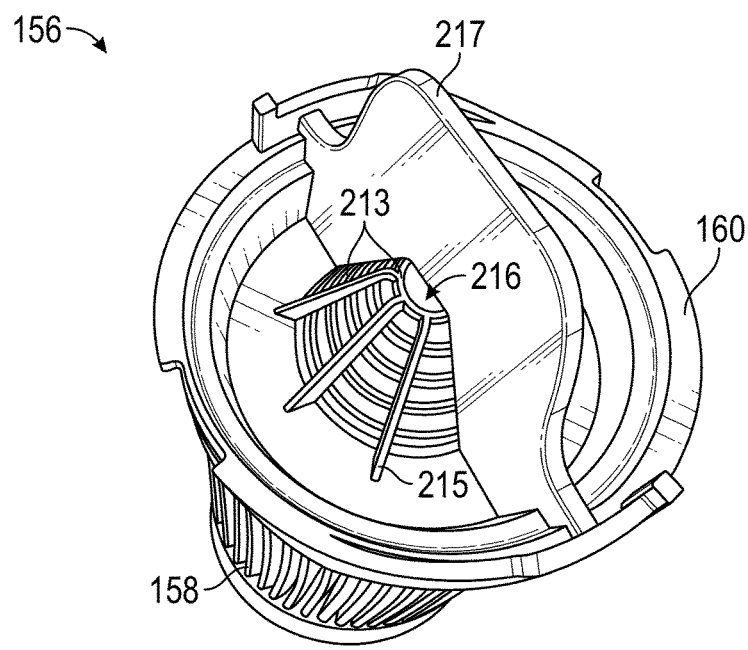
FIG. 8B is another perspective view of the filter of the oil filter assembly of FIG. 8.
Figure 8C:
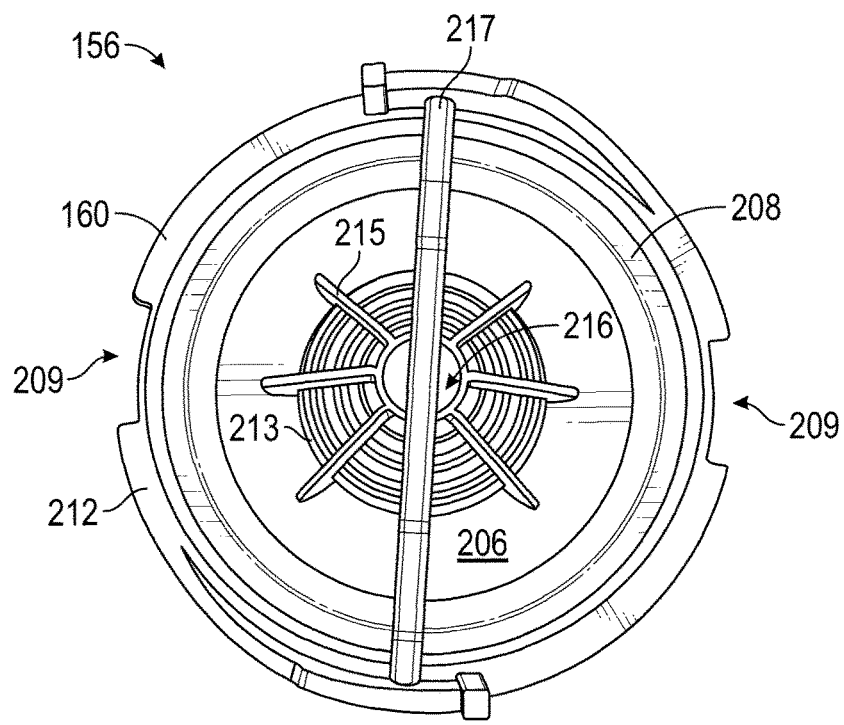
FIG. 8C is a top view of the filter of the oil filter assembly of FIG. 8.
Figure 9:
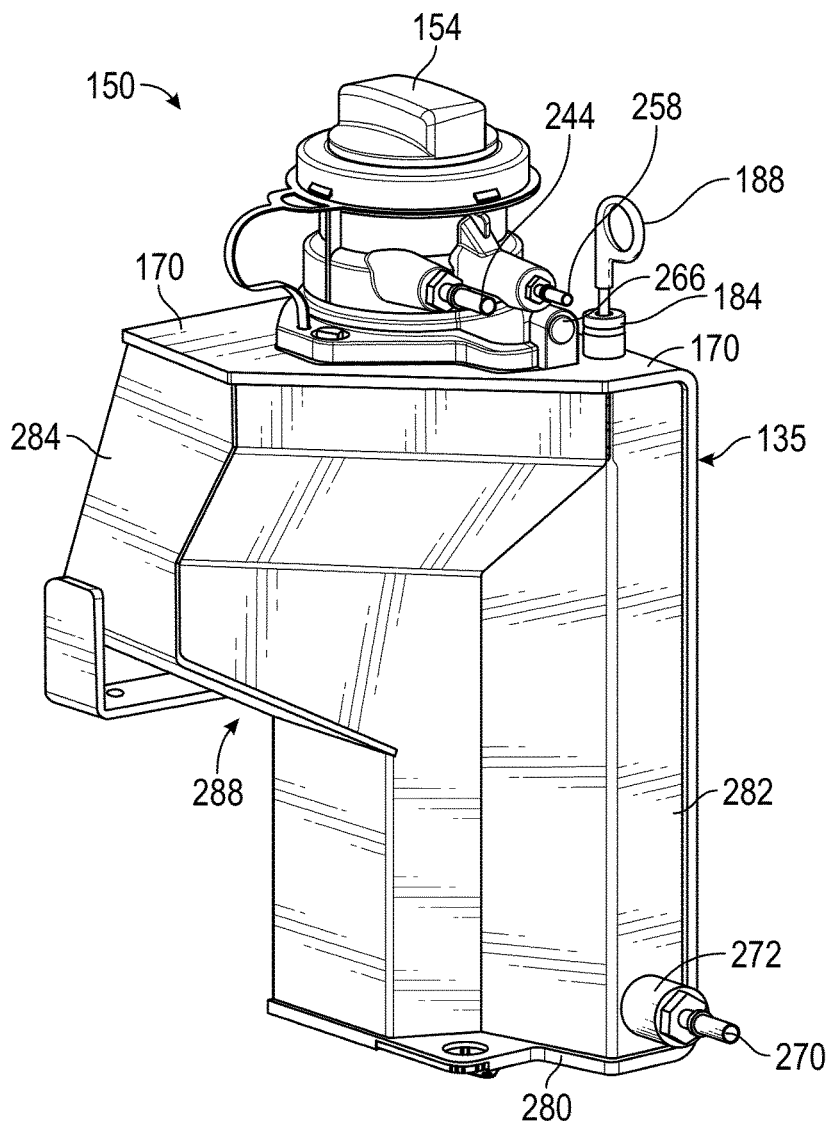
FIG. 9 is a perspective view of an external oil reservoir, according to an exemplary embodiment.
Figure 10:
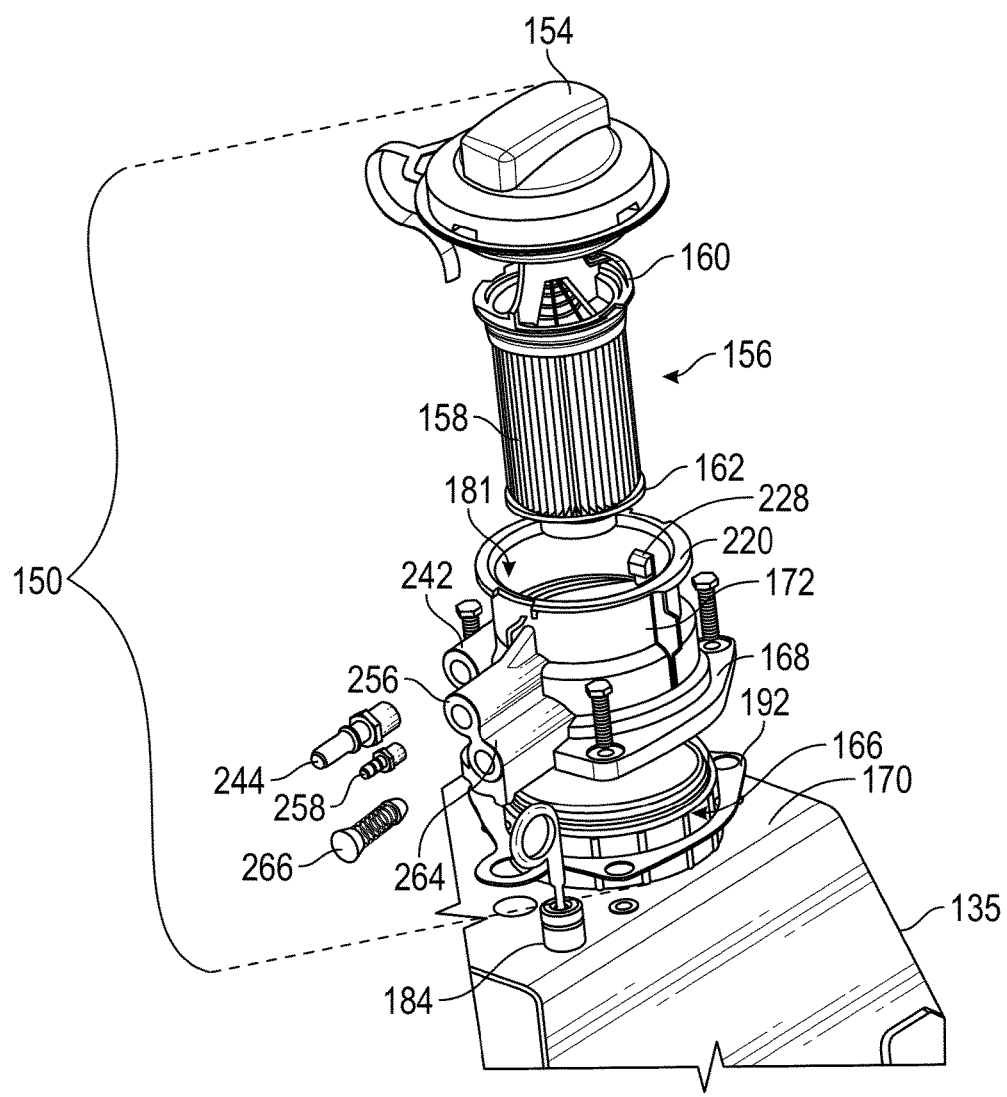
FIG. 10 is an exploded view of a portion of the oil reservoir of FIG. 9.

In some embodiments, as illustrated in FIGS. 5-7, the flange 168 includes a dipstick opening or aperture 182 and a neck or support 184 surrounding the aperture 182. A corresponding dipstick opening 186 is formed in the top 170 of the oil tank 112. A dipstick 188 is guided by the neck 184 through the apertures 182 and 186 into the chamber 148 to measure the oil level therein. In other embodiments, as illustrated in FIGS. 8-10, the flange 168 does not include components related to the dipstick 188 and instead the neck 184 extends upward from the top 170 of the oil tank 112 around a single aperture, the aperture 186 through the top 170.

The top 170 of the oil tank 112 includes an aperture or opening 190 for receiving the lower portion 166 of the housing 152. The flange 168 is attached to the top 170 of the oil tank 112 (e.g., by threaded connection, welding, or other appropriate fastening technique) with a gasket 192 positioned between the flange 168 and the top 170. The lower portion 166 of the housing 152 extends into the aperture 190 in the top 170 of the oil tank 112.

The lower end cap or bottom 162 of the filter 156 includes a flange 194 and a cylindrical neck or collar 196 extending downward from the flange 194. A filter outlet, aperture, or opening 198 is formed through the flange 194 and the collar 196 to allow filtered oil to exit the filter 156. An O-ring or gasket 200 is positioned within a circumferential groove 201 in the collar 196 to provide a seal between the lower end cap 162 and the bottom 174 of the lower portion 166 of the housing 152 when the filter 156 is attached to the housing 152.

A cylindrical support or conduit 202 extends between and is coupled to the lower end cap 162 and the upper end cap 160. The support 202 includes multiple openings 204 to allow oil filtered by the filter media 158 to pass through the support 202 to the filter outlet 198. The filter media 158 (e.g., pleated filter paper or other appropriate filter material) also extends between and is coupled to the lower end cap 162 and the upper end cap 160. The lower end of the filter media 158 contacts the flange 194 of the lower end cap 162 and a base 206 of the upper end cap 160.

Figure 8D:
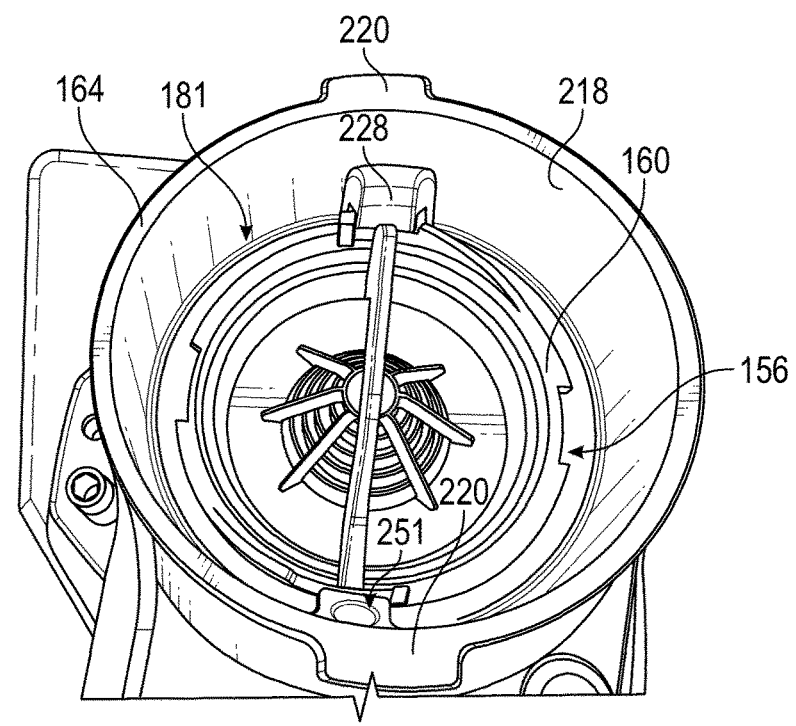
FIG. 8D is a perspective view from above of a portion of the oil filter assembly of FIG. 8.

As shown in FIGS. 8-8D, the upper end cap or top 160 includes the base 206 and a sidewall 208 extending upward from the periphery of the base 206. An O-ring or gasket 210 is positioned within a circumferential groove 211 in the sidewall 208 to provide a seal between the upper end cap 160 and the upper portion 164 of the housing 152. Above the gasket 210, quick-connect tabs, lugs, or protrusion 212 extends outward from the sidewall 208. The protrusion 212 includes one or more recesses 209 to allow a corresponding protrusion 228 of the housing 152 to pass through the protrusion 212 of the end cap 160. A fill inlet, screen, or grill 214 including one or more openings or apertures 216 functions as an oil inlet, allowing oil to flow through the upper end cap 160, the support 202, and the lower end cap 162 to the chamber 148 and as an air vent, allowing air to flow from the chamber 148 through the lower end cap 162, the support 202, and the upper end cap 160. In some embodiments, as illustrated, the screen 214 is a frustoconical in shape with a series of circular walls 213 or members surrounding a central aperture 216 and separated from each other by apertures 216 decreasing in diameter as the screen 214 extends axially away from the base 206. A series of ribs 215 connect the walls 213 to each other and the base 206. A handle 217 extends through a midpoint of the screen 214 and includes a grasping portion located above the screen 214 to provide a grasping point for the user to manipulate the filter 156 as needed to attach and remove the filter 156 from the housing 152.

The filter body 172 of the upper portion 164 of the housing 152 includes an upper sidewall 218. Two quick connect protrusions or tabs 220 extends outward from the upper sidewall 218. A platform or shelf 224 extends inward from the upper sidewall 218 to a neck or collar 226. The inner diameter of the upper sidewall 218 is greater than the inner diameter of the collar 226, with the shelf 224 taking up the distance in between. The collar 226 extends downward from the shelf 224 and is spaced apart from a lower sidewall 232 to form an annular volume between the collar 226 and the lower sidewall 232. Two quick-connect protrusions 228 are located above the shelf 224 and extend outward from the upper sidewall 218 to form a groove 230 between the protrusions 228 and the shelf 224 for receiving the protrusions 212 of the upper end cap 160 of the filter 156. The shelf 224, the protrusions 228, the groove 230, and the protrusions 212 interact to form a quarter-turn quick-connect connection between the upper end cap 160 of the filter 156 and the upper portion 164 of the housing 152 so that a user can quickly and easily attach the filter 156 to the housing 152 and quickly and easily un-attach the filter 156 from the housing 152. Alternatively, other quick-connect arrangements or other types of attachments (e.g. a threaded attached) may be used to attach the filter 156 to the housing 152. With the filter 156 attached to the housing 152, the gasket 210 forms a seal between the upper end cap 160 of the filter 156 and the upper sidewall 218 of the filter body 172 of the upper portion 164 of the housing 152.

The cover 154 closes the upper end of the filter chamber 181 when attached to the upper portion 164 of the housing 152. The cover 154 includes a groove 234 formed between an outer wall 236 and an inner wall 238. An O-ring or gasket 239 is positioned in a groove in the inner wall 238 and forms a seal with the upper sidewall 218 of the upper portion 164 of the housing 152 when the cover 154 is attached to the housing 152. The cover 154 and the protrusions 220 of the upper portion 164 of the housing 152 interact to form a quarter-turn quick-connect connection between the cover 154 and the upper portion 164 of the housing 152 so that a user can quickly and easily attach the cover 154 to the housing 152 and quickly and easily un-attach the cover 154 from the housing 152. Alternatively, other quick-connect arrangements or other types of attachments (e.g. a threaded attached) may be used to attach the cover 154 to the housing 152.

The cover 154 also includes a protrusion 240 that extends downward from the top of the cover 154 into the interior of the cover 154. If the filter 156 is not properly attached to the housing 152, the filter 156 will sit up higher within the filter chamber 181 than when properly attached and the protrusion 240 will contact the handle 217 of the filter 156, preventing the cover 154 from being attached to the housing 152. This provides a physical indication (the impact between the protrusion 240 and the handle 217) and a visual indication (the cover 154 not seated properly on the housing 152) to the user that the oil filter 156 has not been properly attached to the housing 152. As shown in FIG. 8, when the filter 156 is properly attached to the housing 152, the protrusion 240 does not contact the handle 217 and the cover 154 can be properly seated and attached to the housing 152. In some embodiments, the cover 154 is attached to the upper end cap 160 of the filter 156 so that the cover 154 and filter 156 may be separated from the housing 152 as a single integral unit.

Figure 8E:
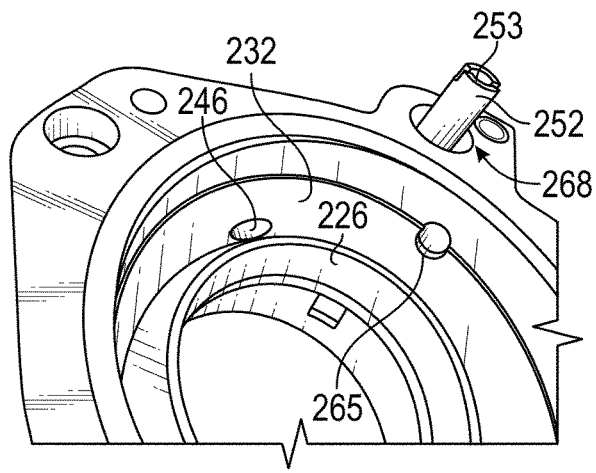
FIG. 8E is a perspective view from below of the upper portion of the filter housing of the oil reservoir of FIG. 5.

The upper portion 164 of the housing 152 also includes a return conduit 242 that receives return oil from the return pump 114. A return inlet 244 is in fluid communication with the return outlet 129 of the return pump 114 (e.g., by a hose or other conduit). As illustrated, the return inlet 244 includes a fitting for connecting a hose or other conduit to the oil filter assembly 150. The return conduit 242 is in fluid communication with the filter chamber 181 through a return outlet 246 to deliver return oil to the outside (dirty) side of the filter 156. The return outlet 246 is located below the upper end cap 160 and the shelf 224 to deliver oil to the filter chamber 181 below the seal formed by the gasket 210 between the upper end cap 160 and the upper portion 164 of the housing 152. The return outlet 246 is located between the seal formed by the gasket 210 between the upper end cap 160 and the upper portion 164 of the housing 152 and the seal formed by the gasket 200 between the lower end cap 162 and the lower portion 166 of the housing 152. As shown in FIG. 8E, the return outlet 246 is formed in the lower sidewall 232 so that return oil enters the annular volume between the lower sidewall 232 and the collar 226. The direction of return oil flow is substantially tangential to the collar 226 to induce circular flow of the return oil through the annular volume between the lower sidewall 232 and the collar 226 to distribute the return oil around the circumference of the filter media 158.

The upper portion 164 of the housing 152 also includes a vent assembly 248 that provides a flow path for air from the external oil tank 112 to the engine 100. The vent assembly 248 includes a filter conduit 250 in fluid communication with the filter chamber 181, a tank conduit 252 in fluid communication with the oil chamber 148 through an opening or aperture 254 formed through the top 170 of the oil tank 112, and an engine conduit 256 including a vent outlet 258. As illustrated, the vent outlet 258 includes a fitting for connecting a hose or other conduit to the vent assembly 248.

All three conduits 250, 252, and 256 are in fluid communication with each other at a joint or manifold 259. The conduit 250 includes an inlet aperture 251 in fluid communication with the filter chamber 181 above the upper end cap 160 (FIG. 8D) so that the conduit 250 provides a flow path for air to exit the filter chamber 181. The conduit 252 includes an inlet aperture 253 in fluid communication with oil the chamber 148 and positioned in the oil chamber 148 to provide a flow path for air to exit the oil chamber 148. The conduit 256 includes an inlet aperture 257 in fluid communication with the manifold 249 to provide a flow path for air to travel from the oil tank 112 to the engine 100.

Figure 11:
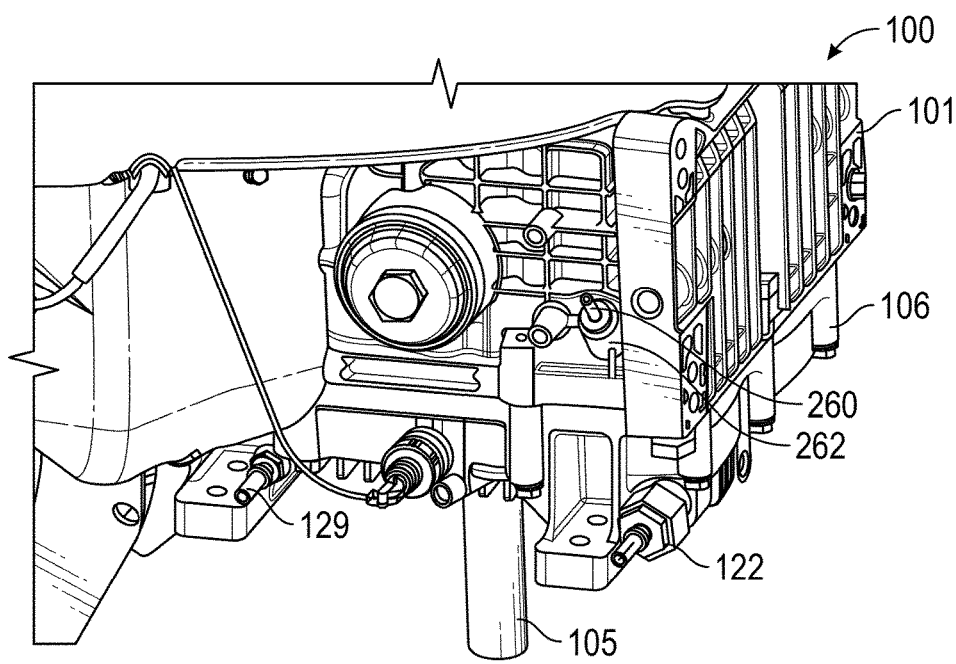
FIG. 11 is a perspective view of a portion of the engine of FIG. 1.

FIG. 11 illustrates a portion of the engine 100 including a vent inlet 260 for receiving air from the vent assembly 248 of the oil filter assembly 150. As illustrated, the vent inlet 260 is includes a fitting for connecting a hose or other conduit to the engine 100. The vent inlet 260 is in fluid communication with the crankcase chamber 130 via a vent conduit 262 to vent air from the oil tank 112 to the engine 100.

The upper portion 164 of the housing 152 also includes a bypass conduit 264, a bypass valve 266 and a bypass passage 268. The bypass conduit 264 is fluid communication with the filter chamber 181 and the bypass passage 268. A bypass inlet 265 is formed in the lower sidewall 232 of the upper portion 164 of the housing 152. The bypass passage 268 is a volume in fluid communication with the chamber 148 of the oil tank 112 via the opening 254 formed through the top 170 of the oil tank 112 (FIG. 8) and in fluid communication with the filter chamber 181 below the upper end cap 160 via the bypass inlet 265 (FIG. 8E). The bypass valve 266 is positioned in the bypass conduit 264 and selectively opens and closes to allow fluid flow from the filter chamber 181 to the chamber 148 via the bypass passage 268. The bypass valve 266 is normally-closed and pressure actuated so that when the pressure in the filter chamber 181 reaches a threshold pressure, the valve 266 opens and allows pressurized oil from the filter chamber 181 flow to the chamber 148 of the oil tank 112 without passing through the filter 156. This may occur when the filter 156 is clogged or dirty and not able to filter the volume of oil attempting to pass through the filter 156 or during cold engine starting conditions, in which relatively high viscosity of the oil slows the rate at which oil passes through the filter 156, causing the filter chamber 181 to fill with oil and exceed the threshold pressure of the bypass valve 266. The tank conduit 252 of the vent assembly 248 extends downward from the manifold 259 through the bypass passage 268 and the opening 254 through the top 170 of the oil tank 112 into the chamber 148 of the oil tank 112.

As shown in FIG. 7, the oil tank 112 includes a supply outlet 270. As illustrated, the supply outlet 270 includes a fitting for connecting a hose or other conduit to the oil tank 112. The supply outlet 270 is in fluid communication with a supply conduit 272 that extends into the chamber 148 of the oil tank 112. The supply conduit 272 includes a supply inlet 274 located near a front 276 of the oil tank 112. When a lawn mower or other equipment including the engine 100 an the oil tank 112 is tilted or tipped forward toward the front 276 (e.g., when traveling down a hill or incline), the oil in the chamber 148 moves toward the front 276 and the supply inlet 274, which will reduces possible occurrences of the supply pump 113 being starved for oil from the oil tank 112 due to an insufficient or otherwise unavailable oil supply. A screen may be provided in the supply conduit 272 to filter large particulates and prevent them from reaching the engine 100. A drain 278 is provided for draining oil from the chamber 148.

The recommended fill level 279 of the chamber 148 of the oil tank 112 is located below the level 281 of filter outlet 198 the oil filter 156. This arrangement prevents the filter outlet 198 from being submerged in a volume of standing oil within the chamber 148, which creates an unwanted back-pressure on the oil filter 156 that prevents incoming oil from properly flowing through the filter. This arrangement also positions the bottom of the filter media 158 above the recommended fill level 279 which prevents the filter media 158 from being submerged in standing oil. In a preferred embodiment, the recommended fill level or recommended oil fill capacity 279 provides five quarts of oil for use by the engine 100 and the oil chamber 148 has six quarts of capacity below the level 281 of the filter outlet 198.

The tank body 135 of the oil tank 112 includes the top 170, a bottom 280, the front 276, a rear 282, a left side 284, and a right side 286 that in combination define the volume of the oil chamber 148. The oil tank 112 is relatively tall with its height (top to bottom) exceeding its width (left side to right side) and depth (front to rear). A recess 288 is formed in the rear 282 near the left side 284 to allow the oil tank 112 to be positioned closely to the engine 100. The recess 288 allows the oil tank 112 to be positioned near the rear 136 of the engine 100 and next to the cylinder 103. As shown in FIG. 1, a volume 290 having a triangular cross-section is formed by a plane 292 extending along the rear 136 of the engine 100 (horizontal as illustrated), a plane 294 extending forward from the front outer corner of the blower housing 110 covering the cylinder 103 (vertical as illustrated and parallel to the right side 280 of the oil tank 112), and a plane 296 extending along the outer edge of the blower housing 110 covering the cylinder 103 (angled and intersecting the planes 292 and 294 as illustrated). At least a portion of the oil tank 112 is located within the triangular cross-section of the volume 290 and is considered to be located at least in part between the rear 136 of the engine 100 and the cylinder head 139 of the cylinder 103. In alternative embodiments, the oil tank 112 could be similarly configured but be located between the rear 136 of the engine 100 and the cylinder head 137 of the cylinder 102.

Figure 12:
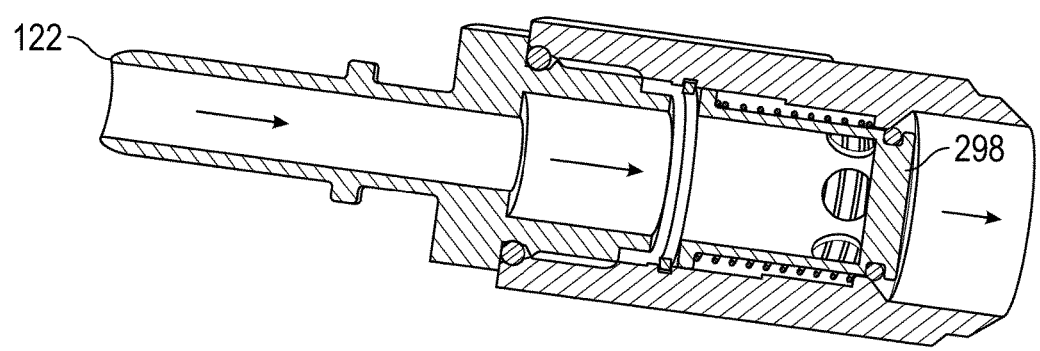
FIG. 12 is a section view of a check valve, according to an exemplary embodiment.

As shown in FIG. 12, a check valve 298 is positioned downstream of the supply inlet 122. The check valve 298 is normally closed to prevent oil from the oil tank 112 draining to the crankcase chamber 130 through the supply conduit (e.g., when the engine 100 is not running). The check valve 298 opens and allows oil to flow from the oil tank 112 to the engine 100 when the supply pump 113 produces a vacuum in the supply port 122 sufficient to overcome the threshold of the check valve 298.

Figure 13:
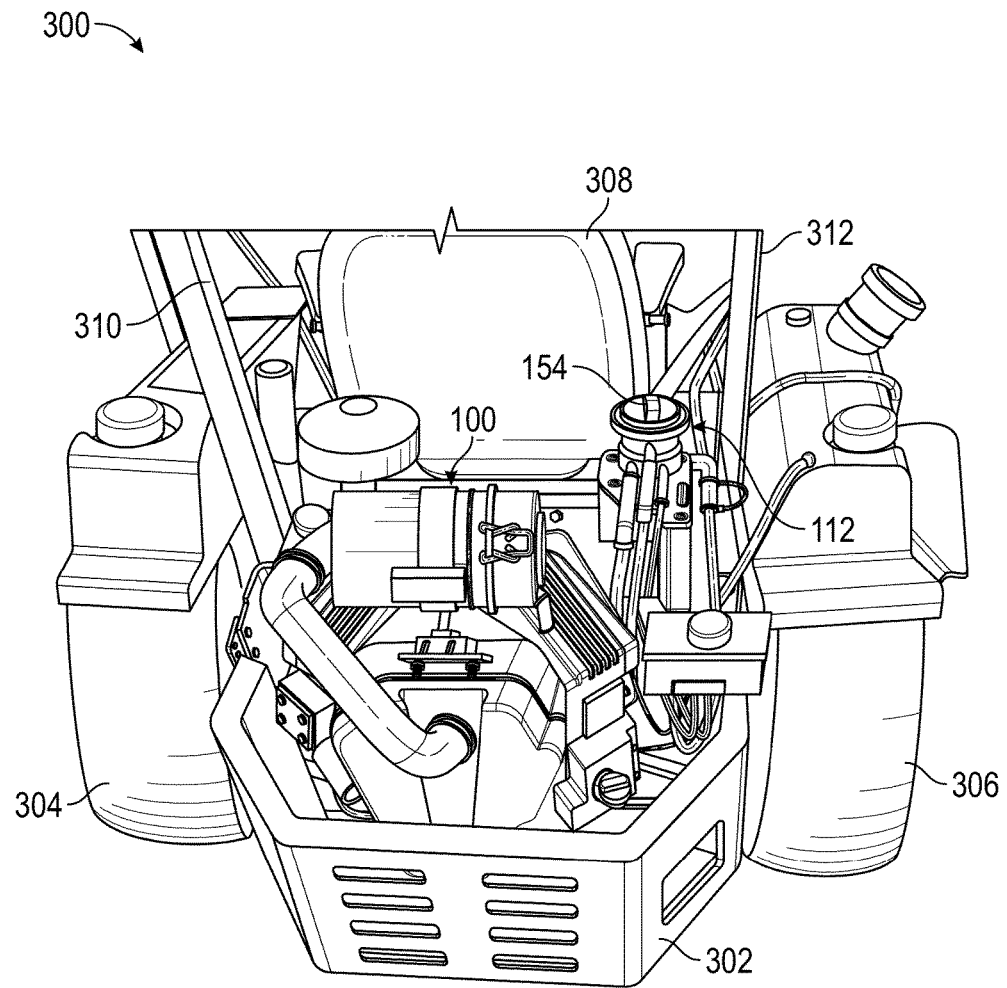
FIG. 13 is a perspective view of a portion of a lawn mower including the engine assembly of FIG. 1.
Figure 14:
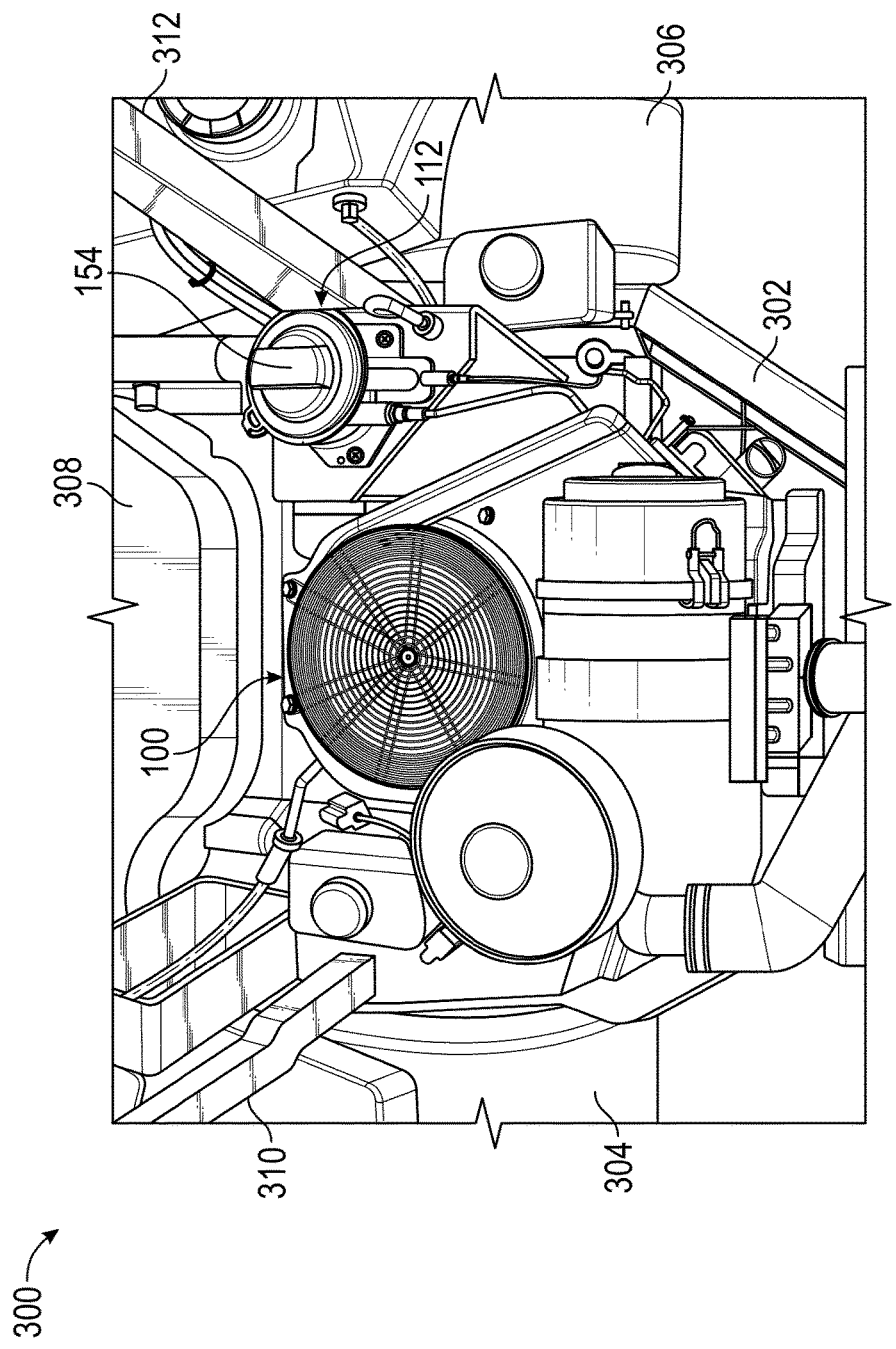
FIG. 14 is a top view of a portion of the lawn mower of FIG. 13.

FIGS. 13 and 14 illustrate the engine 100 and the external oil tank 112 in use on a zero-turn lawn mower 300. In other embodiments, the engine 100 and the external oil tank 112 are used with other types of outdoor power equipment, including riding lawn tractors or other riding outdoor power equipment. The engine 100 and the external oil tank 112 are located on a mounting platform 302 located between the two rear wheels 304 and 306 and behind the operator location 308, illustrated as a seat. The engine 100 and the external oil tank 112 are also located between the vertical legs 310 and 312 of a roll bar for protecting the operator. The uppermost point of the oil tank 112 (i.e., the cover 154) is located well below the top of the back 314 of the operator seat 308. A portion of the oil tank 112 is located between the seat 308 and the engine 100. Locating the tank 112 near the operator location 308, within the vertical legs 310 and 312 of the roll bar, near the center of the mower (i.e., between the wheels 304 and 306), and relatively low (i.e., the uppermost point below the top of the back 314 of the operator seat 308) helps to protect the oil tank 112 from collisions (e.g., from branches or other overhanging obstacles) because the tank is close to the operator and reduces the likelihood the oil tank 112 will interfere with baggers or other accessories that may be mounted to the mower 300.

To install the oil filter 156, the user grasps the handle 217 and inserts the oil filter 156 into the filter chamber 181 of the filter housing 152. The collar 196 of the lower end cap 162 is inserted into the aperture 178 in the bottom 174 of the lower portion 166 of the housing 152 so that the gasket 200 forms a seal between the collar 196 of the lower end cap 162 and the collar 180 of the housing 152. The user then rotates the filter 156 a quarter turn (i.e., 90 degrees) so that the shelf 224, the protrusions 228, the groove 230, and the protrusions 212 interact to form a quarter-turn quick-connect connection between the upper end cap 160 of the filter 156 and the upper portion 164 of the housing 152 to attach the filter 156 to the housing 152. The user may add oil to the oil tank 112 through the screen 214. This process requires about two and a half minutes to fill the oil chamber 148 to the recommended oil tank fill level of five quarts. In some embodiments, the entire lubrication system consisting of the engine 100, the oil tank 112, and the conduits connecting the two has an overall recommended oil capacity or fill level of six quarts of oil. Alternatively, the user may add oil to the oil tank 112 prior to installing the filter 156 by pouring oil through the aperture 178 in the bottom 174 of the lower portion 166 of the housing 152. This process requires less than one minute to fill the oil chamber 148 to the recommended oil tank fill level of five quarts. Filling through the screen 214 allows the user to add oil to the oil tank 112 without unseating or un-attaching the oil filter 156 from the filter housing 152. For example, a user can top off the amount of oil in the oil tank 112 as needed after checking the fill level with the dipstick 188, without having to remove or unseat the oil filter 156. This reduces the chances of operating the engine 100 with the oil filter 156 not being properly attached by reducing the number of times a user needs to remove or adjust the oil filter 156. The screen 214 prevents large debris (e.g., twigs, grass clippings, etc.) from entering the oil chamber 148 through the oil filter 156.

The cover 154 is attached by the user grasping the cover 154, positioning the cover 154 over the protrusions 220 of the upper portion 164 of the housing 152 and rotates the cover 154 a quarter turn (i.e., 90 degrees) so that cover 154 and the protrusions 220 interact to form a quarter-turn quick-connect connection between the cover 154 and the upper portion 164 of the housing 152 to attach the cover 154 to the housing 152. To change the oil filter 156, the user removes the cover 154 from the housing 152. The filter 156 is lifted upward away from the housing 152 so that excess oil will tend to drain down off of the filter 156 into the filter chamber 181 of the housing 152 and from the filter chamber 181 to the oil tank 112. This arrangement helps to reduce the mess of dirty oil that is common when changing the oil filter of a conventional oil filter assembly.

FIG. 15A provides a schematic illustration of an engine assembly including the engine 100 and the external oil tank 112. In operation, the return pump 114 creates a vacuum to draw in oil from the crankcase chamber 130 through the return inlet 128. The return pump 114 pressurizes the oil (e.g., to about 5 psi (about 3.447e+004 newtons/square meter)) and distributes the pressurized return oil via the return outlet 129 to the return inlet 244 of the oil filter assembly 150 through a return oil conduit 314. The return oil is transported via a low pressure hose, line, or conduit 314 that fluidly couples the return outlet 129 with the return inlet 244. The return oil tends to be hot and aerated (frothy). A pressure relief valve or other device may be provided to limit pressure of the return oil provided to the oil filter assembly 150 to be below a threshold pressure. In some embodiments, the return pump 114 generates between 4 and 5 pounds per square inch (2.758e+004 and 3.447e+004 newtons/square meter) (psi) in a ⅜ inch (0.9525 centimeter) diameter return oil conduit 314 during normal operation. In some embodiments, the return pump generates less than 10 pounds per square inch (6.895e+004 newtons/square meter). This pressure provides sufficient flow of return oil to the oil tank 112 during operation of the engine 100.

As shown in FIG. 8, the return oil enters the oil filter housing 152 through the return inlet 244 and passes through the return conduit 242 to the filter chamber 181 between the seals formed by the gasket 210 of the upper end cap 160 and the gasket 200 of the lower end cap 162. This sealed portion of the filter chamber 181 is pressurized by the incoming return oil. The pressure forces the oil through the filter media 158, thereby filtering particulates from the return oil and also separating air from the aerated return oil.

The separated air is returned to the engine 100 via the vent assembly 248. The air travels upward through the support 202, passes through the screen 214 and is drawn into the filter conduit 250 of the vent assembly 248 and travels to the manifold 259. The vent assembly 248 also allows air from the oil chamber 148 of the oil tank 112 to vent to the engine 100. Air from the oil chamber 148 enters tank conduit 252, mixes with air from the filter conduit 250 at the manifold 249, and the mixture passes through the manifold 259 to the engine conduit 256. The air leaves the engine conduit 256 through the vent outlet 258 into a vent hose, line, or conduit 316 that fluidly couples the vent outlet of the vent assembly 248 with the vent inlet 260 of the engine 100. The vent inlet 260 is in fluid communication with the crankcase chamber 130 so that the air passes from the vent inlet 260 to the crankcase chamber. Differences in pressure between the filter chamber 181, the oil chamber 148, and the crankcase chamber 130 cause the air to flow as described.

The filtered oil passes downward through the support 202 of the oil filter 156 and exits the filter 156 through the filter outlet 198. From the filter outlet 198, the filtered oil enters the chamber 148 of the oil tank 112. There, the oil collects until being drawn back to the engine 100 by the supply pump 113. The supply pump 113 creates a vacuum to draw oil into the supply conduit 272 through the supply inlet 274. The oil exits the supply conduit 272 through the supply outlet 270, which is fluidly coupled to the supply inlet 122 of the supply pump 113 by a supply oil hose, line, or conduit 318. The oil enters the engine 100 through the supply inlet 122 and the supply pump 113 pressurizes the oil (e.g., greater than 30 psi (2.068e+005 newtons/square meter)) and supplies the oil via one or more oil galleries 124 to various locations within the engine, which may include the cylinder heads, the crankshaft, the camshaft, the crankcase chamber, various bearings, and other parts of the engine that require lubrication. In some embodiments, the oil is pressurized by the supply pump 113 to about 40-60 psi (4.137e+005 newtons/square meter).

Conventional automotive dry sump lubrication systems provide the oil filter on the supply side of the system and filter the oil at high pressure, not the return side with filtering done at low pressure (e.g., less than 15 psi (1.034e+005 newtons/square meter)) as in the systems described herein. In a conventional automotive dry sump lubrication system, oil is pumped at high pressure from the crankcase chamber through a first high pressure oil conduit to an oil filter and back from the oil filter at high pressure through a second high pressure oil conduit. By positioning the oil filter assembly 150 on the return side of the dry sump system and filtering at low pressure, the need for high pressure conduits is eliminated, resulting in cost savings and eliminating a location for a possible leak, blow-off, or other malfunction.

In alternative embodiments, as shown in FIG. 15B, a dry sump lubrication system has the oil filter assembly 150 positioned on the supply side of the dry sump system (fluidly coupled between the supply pump 113 and the oil gallery 124) and not the return side (fluidly coupled between the return pump 114 and the oil tank 112), as shown in FIG. 15A. For example, as shown in FIG. 15B, the oil filter assembly 150 is positioned downstream of the supply pump 113 to receive pressurized oil from the supply pump 113. After the return pump 114 sends oil from the crankcase chamber 130 to the oil tank 112, the oil is drawn by the supply pump 113 from the oil tank 112 and is sent from the supply pump 113 to the oil filter assembly 150. After the pressurized oil is filtered by the oil filter 156, the filtered pressurized oil exits the oil filter assembly 150 through an outlet 245 fluidly coupled to the oil gallery 124 for distribution in the engine 100. The oil filter assembly 150 and the oil filter 156 used in this arrangement may be a conventional high pressure oil filter assembly and oil filter.

Figure 15C:
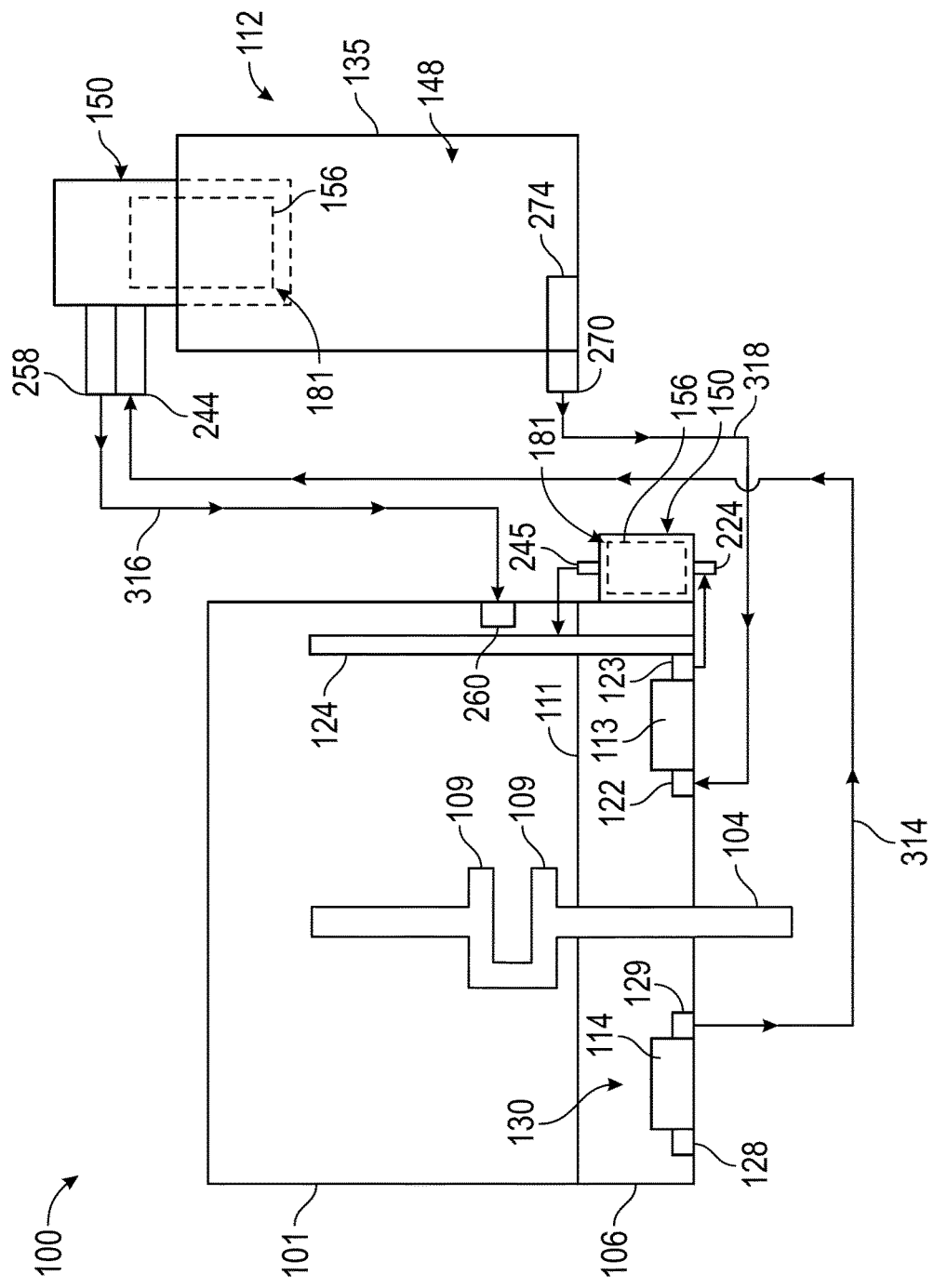
FIG. 15C is a schematic illustration of an engine assembly, according to an exemplary embodiment.

In alternative embodiments, as shown in FIG. 15C, a dry sump lubrication system includes two oil filter assemblies 150 with the first oil filter assembly 150 positioned on the supply side of the dry sump system (fluidly coupled between the supply pump 113 and the oil gallery 124) and the second oil filter assembly 150 positioned on the return side (fluidly coupled between the return pump 114 and the oil tank 112). This arrangement provides extra filtering capabilities as compared to the arrangements illustrated in FIGS. 15A and 15B.

Referring to FIGS. 16-20, an engine assembly including an internal combustion engine 400 and external oil tank or reservoir 412 is illustrated according to an exemplary embodiment. The engine 400 and the oil tank 412 are similar in many respects to the engine 100 and the oil tank 112 described above, with differences described in more detail below.

Figure 16:
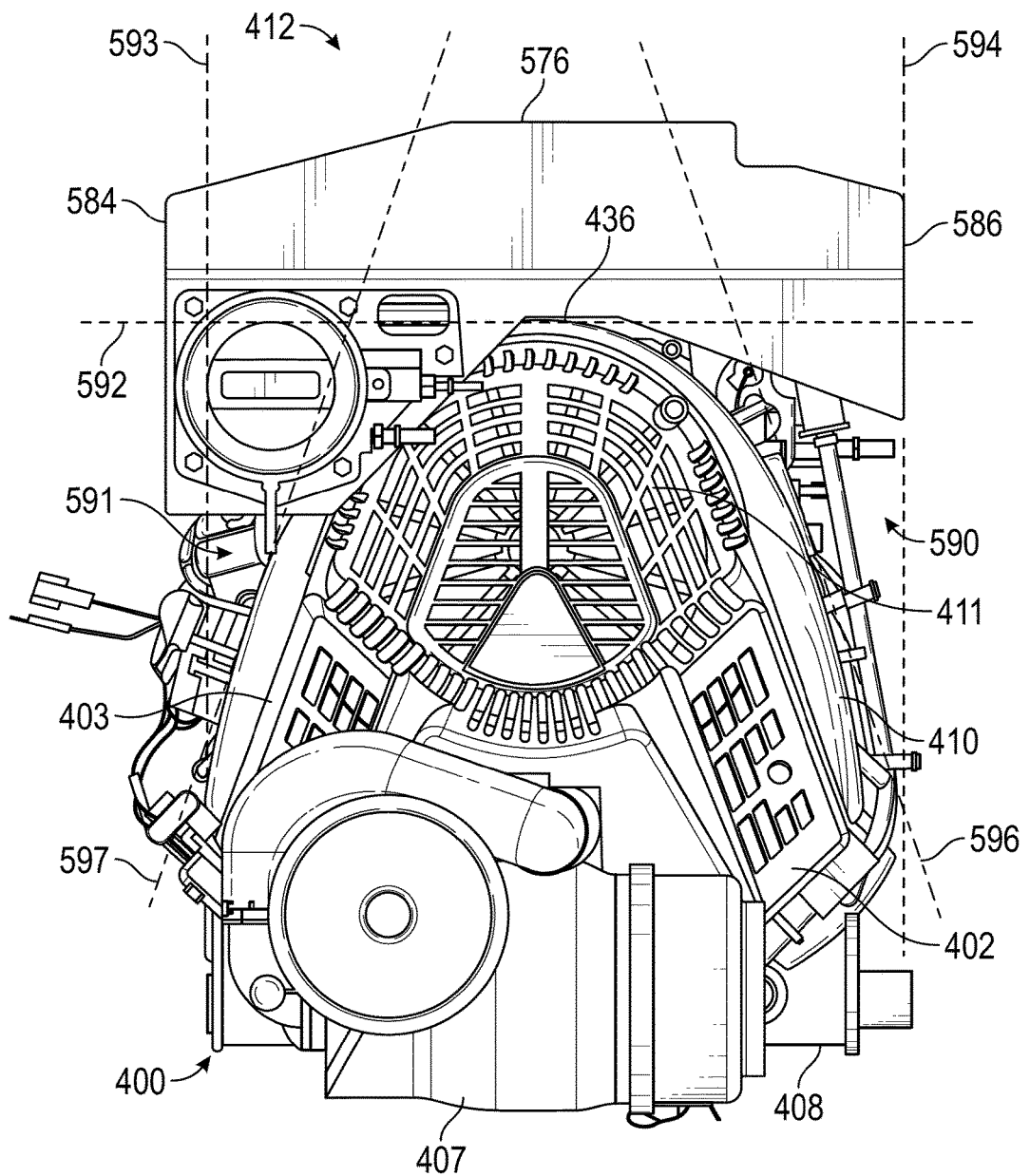
FIG. 16 is a top view of an engine assembly including an engine and an external oil reservoir, according to an exemplary embodiment.
Figure 17:
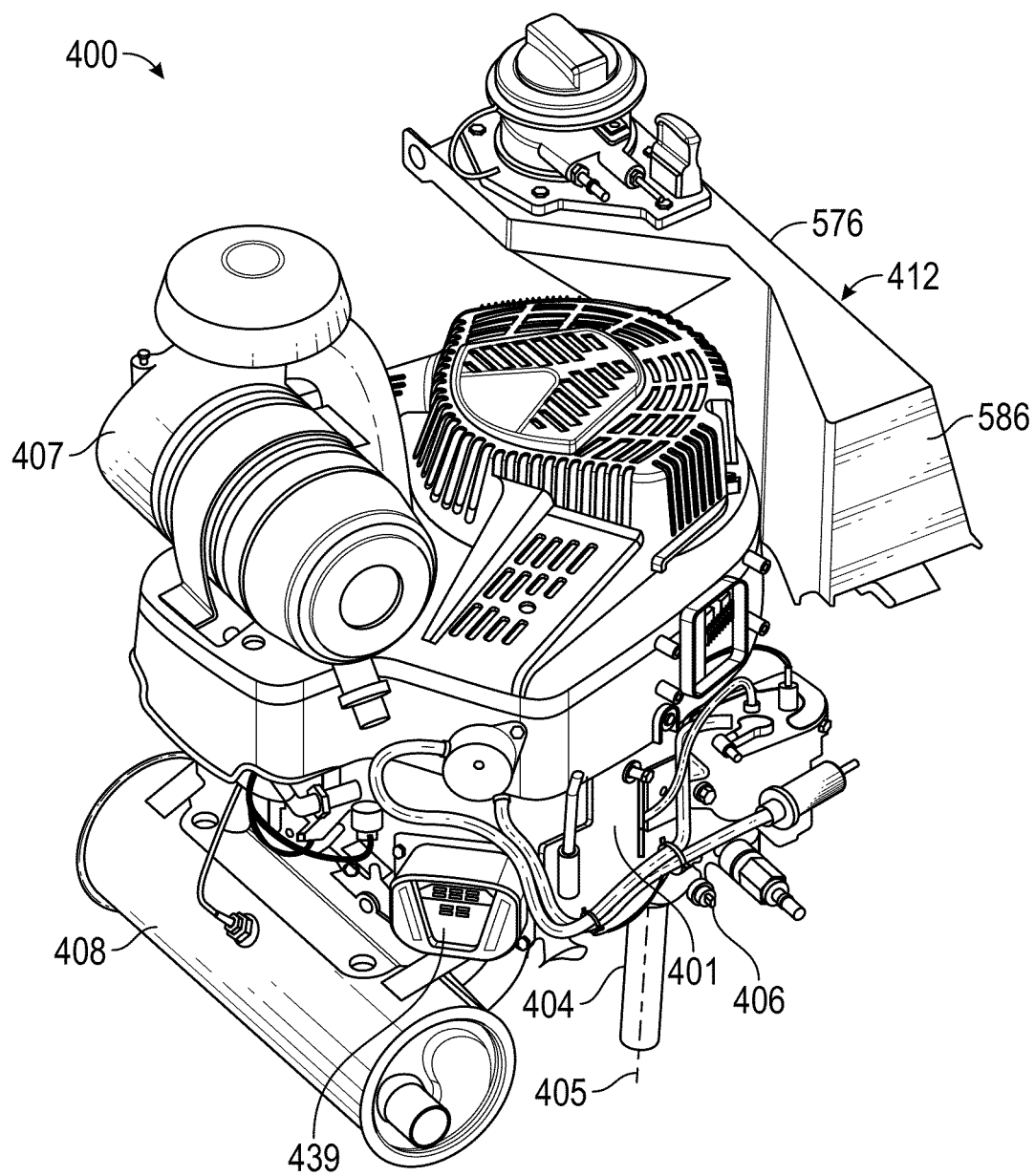
FIG. 17 is a perspective view of the engine assembly of FIG. 16.

As shown in FIGS. 16-17, the internal combustion engine 400 is structurally similar to the engine 100. The engine 400 includes an engine block 401 having two cylinders 402 and 403, two cylinder heads (439 shown in FIG. 17), two pistons, and a crankshaft 404. A crankcase chamber 430 is defined by the engine block 401 and a sump or crankcase cover 406. The engine 400 also includes a fuel system for supplying an air-fuel mixture to the cylinder (e.g., a carburetor, an electronic fuel injection system, a fuel direct injection system, etc.), an air filter assembly 407, a camshaft 419 for actuating intake and exhaust valves in the cylinder heads, a muffler 408, a flywheel, and a blower fan. The engine 400 includes a blower housing 410 configured to direct cooling air over the engine block 401 and other components of the engine. The blower fan pulls air into the blower housing 410 through one or more air inlets 411. The illustrated engine 400 is a vertically-shafted two cylinder engine arranged in a V-twin configuration.

Figure 18:
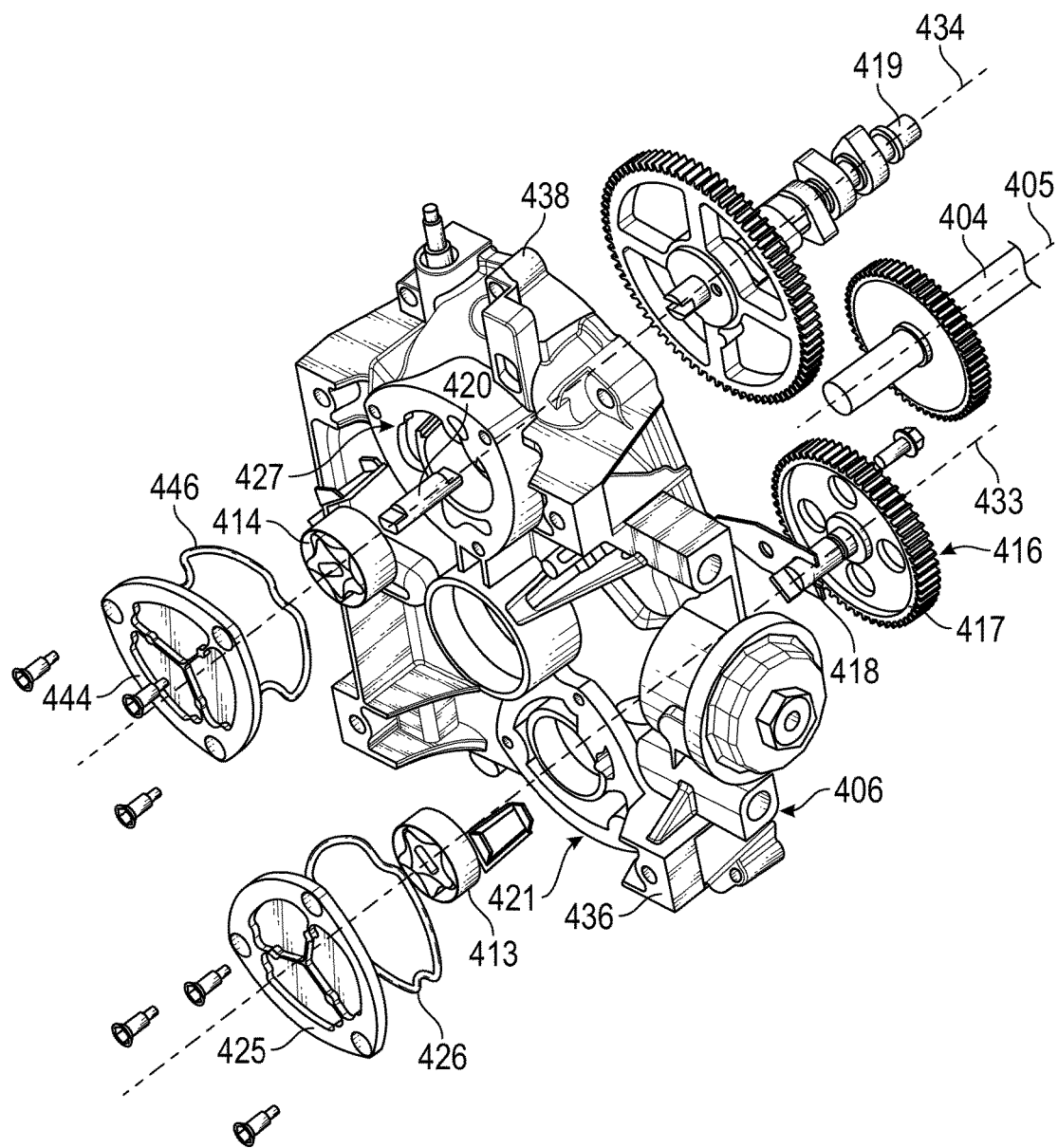
FIG. 18 is an exploded view of the crankcase cover of the engine of FIG. 16.
Figure 19:
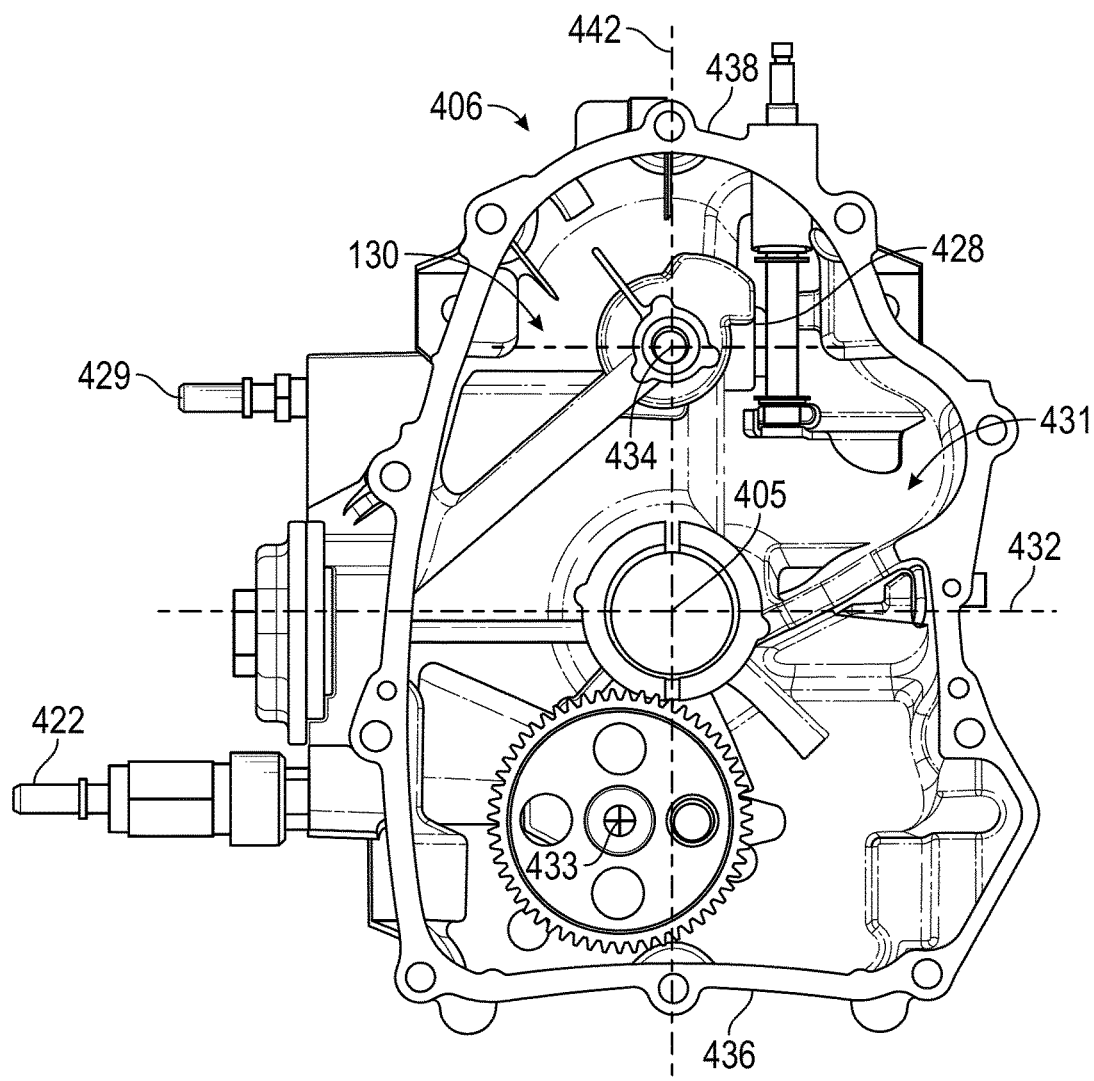
FIG. 19 is a top view of the crankcase cover of FIG. 18.

As shown in FIGS. 18-19, the crankcase cover 406 is structurally similar to the crankcase cover 106. The crankcase cover 406 includes a supply pump 413 and a return pump 414 that are incorporated into the crankcase cover 406. The crankcase cover 406 includes a crankshaft opening or aperture 415 through which the crankshaft 404 extends to drive one or more components of a lawn mower or other piece of equipment. The crankshaft 404 rotates about a crankshaft axis 405. A transmission 416 including one or more gears 417 or other reduction mechanism (e.g., belts) connects the crankshaft 404 to a drive shaft 418 for the supply pump 413 so the supply pump 413 is driven by the crankshaft 404 at a lower rotational speed than that of the crankshaft 404. The supply pump 413 and the drive shaft 418 rotate about an axis of rotation 433. The camshaft 419 is directly connected to a drive shaft 420 for the return pump 414 so the return pump 414 is directly driven by the camshaft 419 at the same rotational speed as the camshaft 419. The return pump 414 and the drive shaft 420 rotate about an axis of rotation 434. A transmission connects the camshaft 419 to the crankshaft 404 so that the camshaft 419 is driven at a rotational speed less than that of the crankshaft 404. The supply pump 413 is located near the rear 426 of the crankcase cover 406 and the engine 400 and the return pump 414 is located near the front 438 of the crankcase cover 406 and the engine 400.

The supply pump 413 is positioned in a supply pump housing 421 formed in the exterior of the crankcase cover 406. The supply pump 413 is in fluid communication with a supply inlet 422 for receiving oil (e.g., supply oil) from the external oil tank 412 and a supply outlet 423 for providing oil for distribution within the engine 400. A cover plate 425 is secured to the crankcase cover 406 (e.g., by threaded fasteners) to close the pump housing 421. A gasket 426 is provided between the cover plate 425 and the crankcase cover 406 to form a seal.

The return pump 414 is positioned in a return pump housing 427 formed in the exterior of the crankcase cover 406. The return pump 414 is in fluid communication with a return inlet 428 for receiving oil (e.g., return oil, scavenged oil) from the crankcase chamber 430 and a return outlet 429 for providing oil to the external oil tank 412. The return inlet 428 is formed through the crankcase cover 406 to place the return pump 414 in fluid communication with the crankcase chamber 430. The return inlet 428 is formed in a front portion 431 of the crankcase cover 406 to be in fluid communication with the front portion of the crankcase chamber 430. The front portion 431 is located forward of a vertical plane 432 including the vertical crankshaft axis 405. The plane 432 is perpendicular to a second vertical plane 442 including the crankshaft axis 405 and the axis of rotation 434 of the return pump 414. The cylinders 402 and 403 and cylinder heads are also located forward of the vertical plane 432. The supply pump axis of rotation 433 is located to the side of the plane 442. The return pump 414 draws oil from the front portion 431 of the crankcase chamber 430 into the return pump 414. A cover plate 444 is secured to the crankcase cover 406 (e.g., by threaded fasteners) to close the pump housing 427. A gasket 446 is provided between the cover plate 444 and the crankcase cover 406 to form a seal.

Figure 20:
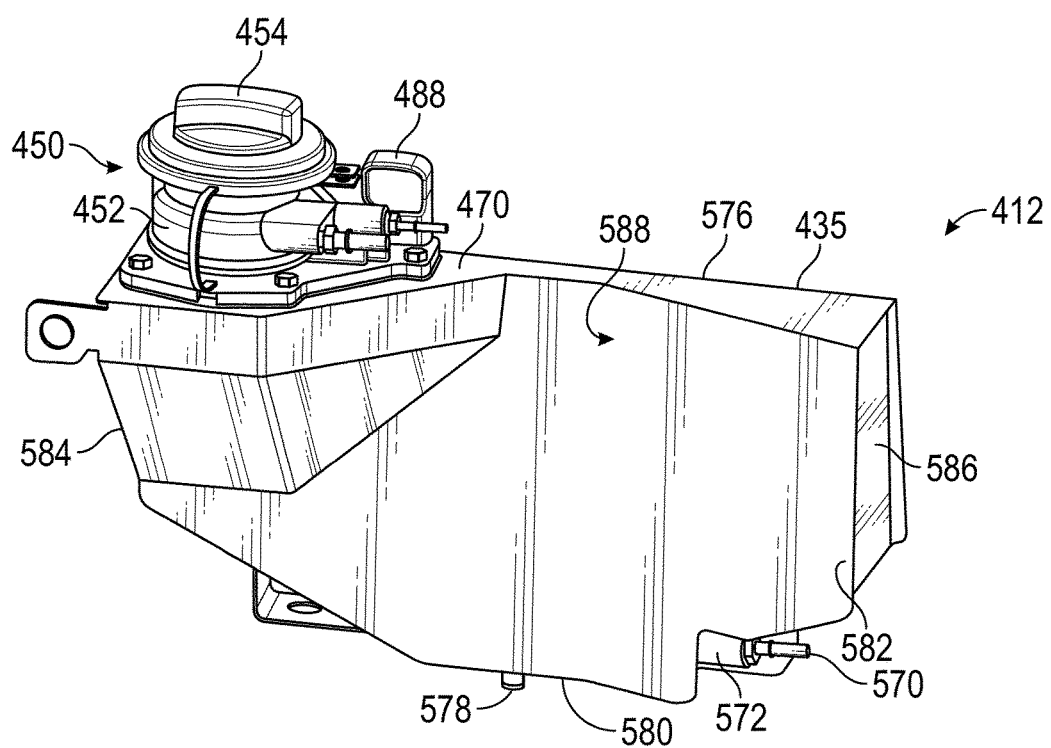
FIG. 20 is a perspective view of the oil reservoir of FIG. 16.

As shown in FIG. 20, the oil tank 412 is structurally similar to oil tank 112. The oil tank 412 includes a tank body 435 that defines an oil reservoir, volume, or chamber for storing oil. The tank body 435 of the oil tank 412 includes a top 470, a bottom 580, a front 576, a rear 582, a left side 584, and a right side 586 that in combination define the volume of the oil chamber. In contrast to the oil tank 112, which is relatively tall, the tank 412 is relatively wide with its width (left side to right side)) exceeding its height (top to bottom) and depth (front to rear). A recess 588 is formed in the rear 582 to allow the oil tank 412 to be positioned closely to the engine 400. The recess 588 allows the oil tank 412 to be positioned near the rear 436 of the engine 100. As shown in FIG. 16, a volume 590 having a triangular cross-section is formed by a plane 592 extending along the rear 436 of the engine 400 (horizontal as illustrated), a plane 594 extending forward from the front outer corner of the blower housing 410 covering the cylinder 403 (vertical as illustrated), and a plane 596 extending along the outer edge of the blower housing 410 covering the cylinder 403 (angled and intersecting the planes 592 and 594 as illustrated). A volume 591 having a triangular cross-section is formed by the plane 592 extending along the rear 436 of the engine 400 (horizontal as illustrated), a plane 593 extending forward from the front outer corner of the blower housing 410 covering the cylinder 402 (vertical as illustrated), and a plane 597 extending along the outer edge of the blower housing 410 covering the cylinder 402 (angled and intersecting the planes 592 and 593 as illustrated). The oil tank 412 is located at least in part within the cross-sections of the two volumes 590 and 591 and is considered to be located at least in part between the rear 436 of the engine 400 and the cylinder head of the cylinder 103 located at least in part between the rear 436 of the engine 400 and the cylinder head of the cylinder 102. Like the oil tank 112, the oil tank 412 includes a supply outlet 570 and a drain 578.

The external oil tank 412 includes an integrated oil filter assembly 450 substantially the same as the oil filter assembly 150, except for a shorter dipstick 488 to account for the shorter height of the oil tank 412. The oil filter assembly 450 includes an oil filter housing 452, an oil filter (not shown), and a cover 454.

Figure 21:
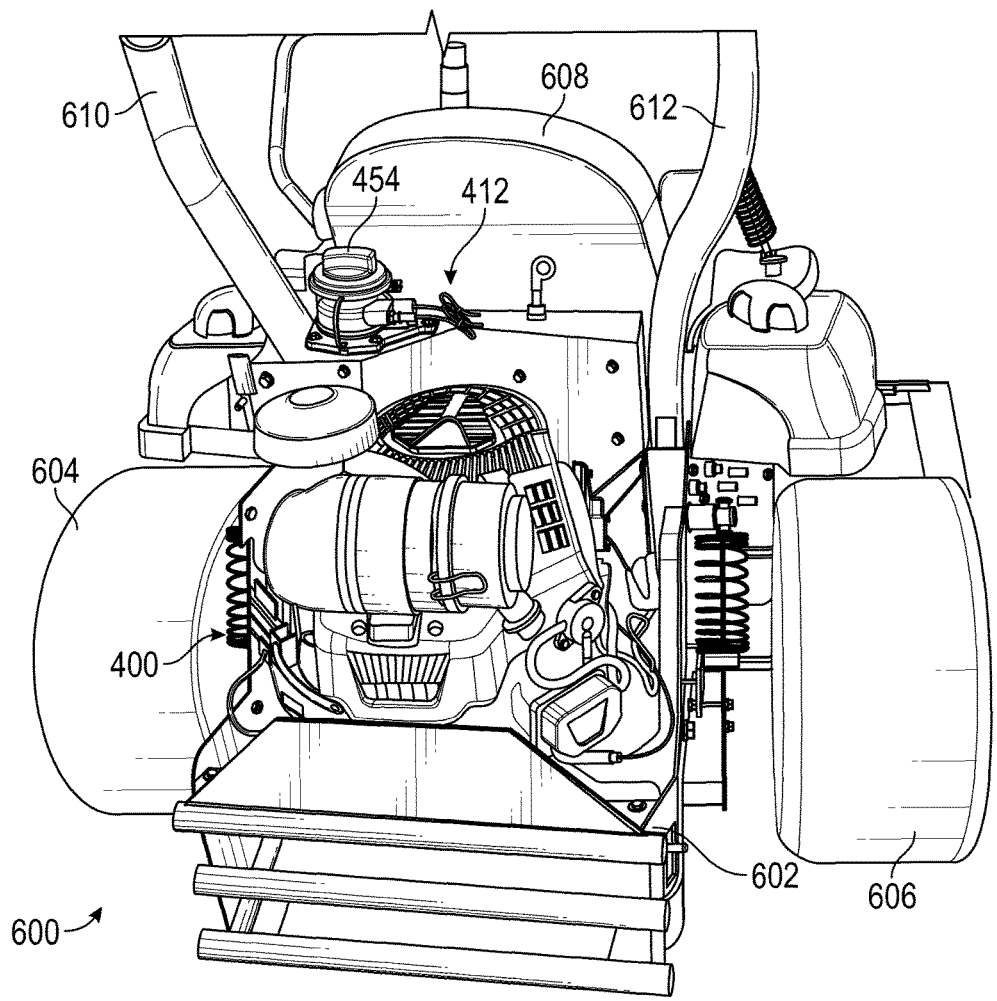
FIG. 21 is a perspective view of a portion of a lawn mower including the engine assembly of FIG. 16.
Figure 22:
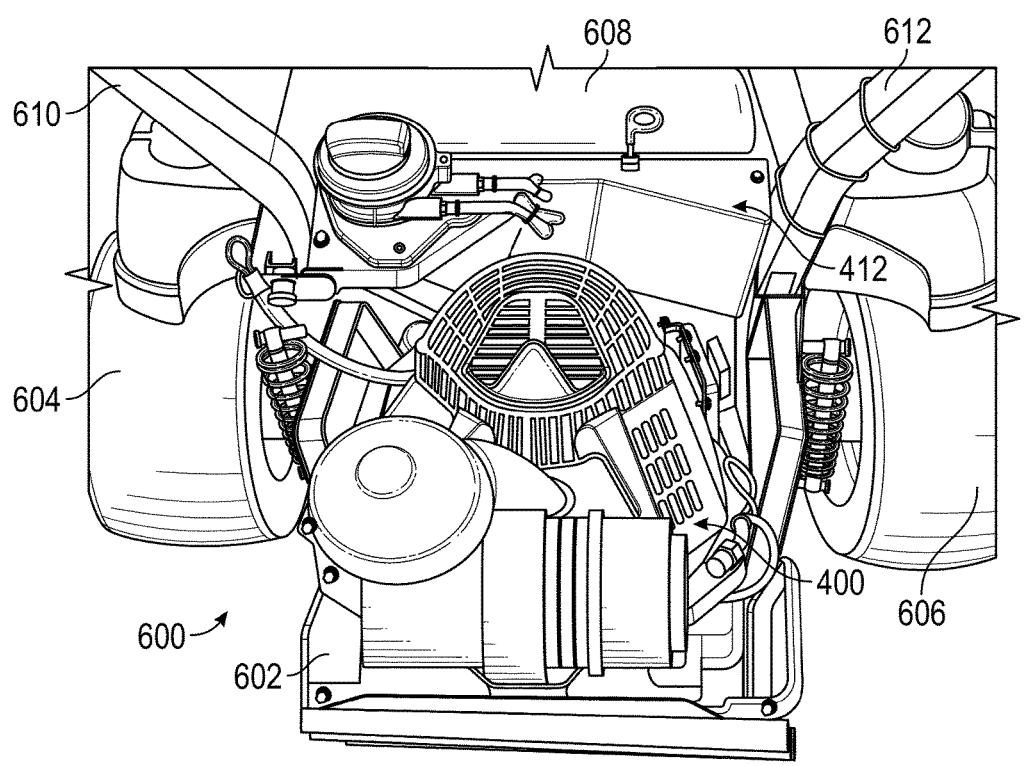
FIG. 22 is a top view of a portion of the lawn mower of FIG. 21.

FIGS. 21-22 illustrate the engine 400 and the external oil tank 412 in use on a zero-turn lawn mower 600. In other embodiments, the engine 400 and the external oil tank 412 are used with other types of outdoor power equipment, including riding lawn tractors or other riding outdoor power equipment. The engine 400 and the external oil tank 412 are located on a mounting platform 602 located between the two rear wheels 604 and 606 and behind the operator location 608, illustrated as a seat. The engine 400 and the external oil tank 412 are also located between the vertical legs 610 and 612 of a roll bar for protecting the operator. The uppermost point of the oil tank 412 (i.e., the cover 454) is located well below the top of the back 614 of the operator seat 608. A portion of the oil tank 412 is located between the seat 608 and the engine 400. Locating the tank 412 near the operator location 608, within the vertical legs 610 and 612 of the roll bar, near the center of the mower (i.e., between the wheels 604 and 606), and relatively low (i.e., the uppermost point below the top of the back 614 of the operator seat 608) helps to protect the oil tank 412 from collisions (e.g., from branches or other overhanging obstacles) because the tank is close to the operator and reduces the likelihood the oil tank 412 will interfere with baggers or other accessories that may be mounted to the mower 600. The engines (100 and 400) and external oil tanks (112 and 412) described herein can be used on different types of lawn mowers than the zero-turn lawn mowers (300 and 600) described herein. For example, the engines and external oil tank can be used on a riding mower that includes a mowing deck, a seat for the operator to sit in, and one or more blades or a drivetrain for one or more wheels (e.g., a transmission) driven by the engine. As another example, the engines and external oil tanks can be used on a wide-area walk-behind walk mower that includes a mowing deck, one or more blades or a drivetrain for one or more wheels (e.g., a transmission), and a handle that allows the user to direct and control the mower while walking behind the mower. As another example, the engines an external oil tanks can be used on a standing lawn mower that includes a mowing deck, a standing platform for the operator to stand on, and one or more blades or a drivetrain for one or more wheels (e.g., a transmission) driven by the engine.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. An engine assembly, comprising:
  an internal combustion engine comprising:
    an engine block;
    an oil gallery configured to distribute oil;
    a crankcase cover; and
    a crankcase chamber defined by the engine block and the crankcase cover;
  an external oil reservoir comprising:
    an oil tank defining an oil chamber; and
    an oil filter assembly comprising:
      a housing at least partially defining a filter chamber, wherein the filter chamber is in fluid communication with the oil chamber;
      a filter positioned within the filter chamber, the filter comprising:
        filter media; and
        a top portion including a fill inlet so that oil can be added to the oil chamber through the oil filter without having the filter media filter the oil;
      a cover for closing the upper end of the filter chamber in a closed position and for providing access to the fill inlet in an open position;
  a supply pump in fluid communication with the oil chamber and the oil gallery, wherein the supply pump is configured to draw oil from the oil chamber and provide pressurized oil to the oil gallery; and
  a return pump in fluid communication with the crankcase chamber and the filter chamber, wherein the return pump is configured to draw oil from the crankcase chamber and provide pressurized oil to the filter chamber;
  wherein the filter is configured to filter the pressurized oil provided to the filter chamber;
  wherein the crankcase chamber and the oil chamber have an overall oil capacity that provides at least five hundred hours of engine oil life.

2. The engine assembly of claim 1, wherein the return pump is configured to pressurize oil to less than ten pounds per square inch.

3. The engine assembly of claim 1, wherein the crankcase chamber has a crankcase volume and the oil chamber has a reservoir volume greater than the crankcase volume.

4. The engine assembly of claim 3, wherein the reservoir volume is at least five quarts.

5. The engine assembly of claim 3, wherein the reservoir volume is greater than five quarts and a recommended oil fill capacity of the oil chamber is five quarts.

6. The engine assembly of claim 1, further comprising:
  a crankshaft including a counterweight positioned in the crankcase chamber;
  wherein a recommended oil level of the crankcase chamber during normal operation of the engine is below a lowermost portion of the counterweight.

7. The engine assembly of claim 1, wherein the oil filter assembly further comprises:
  a vent assembly in fluid communication with the oil chamber, the filter chamber, and the internal combustion engine, wherein the vent assembly is configured to allow air to flow from the filter chamber and the oil chamber to the internal combustion engine.

8. An engine assembly, comprising: an internal combustion engine comprising: an engine block; an oil gallery configured to distribute oil; a crankcase cover; and a crankcase chamber defined by the engine block and the crankcase cover; an external oil reservoir comprising: an oil tank defining an oil chamber; and an oil filter assembly comprising: a housing at least partially defining a filter chamber, wherein the filter chamber is in fluid communication with the oil chamber; a filter positioned within the filter chamber, the filter comprising filter media, a fill inlet, and an oil fill conduit in fluid communication with the fill inlet and extending through the filter media so that oil can be added to the oil chamber through the fill inlet and the oil fill conduit without being filtered by the filter media, wherein the filter further comprises a handle that extends through a midpoint of the fill inlet and includes a grasping portion located above the fill inlet to provide a grasping point for a user to manipulate the filter; and a bypass valve positioned in a bypass passage configured to selectively open in response to a threshold pressure to allow oil to flow from the filter chamber to the oil chamber without being filtered by the filter media; a supply pump in fluid communication with the oil chamber and the oil gallery, wherein the supply pump is configured to draw oil from the oil chamber and provide pressurized oil to the oil gallery; and a return pump in fluid communication with the crankcase chamber and the filter chamber, wherein the return pump is configured to draw oil from the crankcase chamber and provide pressurized oil to the filter chamber; wherein the filter is configured to filter the pressurized oil provided to the filter chamber; wherein the crankcase chamber and the oil chamber have an overall oil capacity that provides at least five hundred hours of engine oil life.

9. The engine assembly of claim 1, wherein the fill inlet comprises a screen.

10. The engine assembly of claim 1, wherein the oil filter further comprises:
  a bottom portion including a filter outlet; and
  an oil fill conduit extending between the top portion and the bottom portion and in fluid communication with the fill inlet and the filter outlet;
  wherein the filter media surrounds the oil fill conduit and is positioned between the top portion and the bottom portion; and
  wherein the oil filter is configured so that oil can be added to the oil chamber through the fill inlet, the oil fill conduit, and the filter outlet without being filtered by the filter media.

11. The engine assembly of claim 1, wherein the oil filter further comprises a quick connect fitting configured to secure the oil filter to the housing.

12. The engine assembly of claim 1, wherein the oil filter further comprises a handle that extends through a midpoint of the fill inlet and includes a grasping portion located above the fill inlet to provide a grasping point for a user to manipulate the oil filter.

13. The engine assembly of claim 12, wherein the cover comprises a protrusion configured to contact the handle of the oil filter when the oil filter has not been properly attached to the housing and the user attempts to move the cover to the closed position; and wherein the protrusion is configured to not contact the handle of the oil filter when the oil filter has been properly attached to the housing and the user moves the cover to the closed position.

14. The engine assembly of claim 8, wherein the fill inlet comprises a screen.

15. The engine assembly of claim 8, wherein the filter further comprises:

a bottom portion including a filter outlet in fluid communication with the fill inlet and the filter outlet.

16. The engine assembly of claim 8, wherein the filter further comprises a quick connect fitting configured to secure the filter to the housing.

17. The engine assembly of claim 8, further comprising a cover for closing the upper end of the filter chamber, the cover having a protrusion configured to contact the handle of the filter when the filter has not been properly attached to the housing and the user attempts to close the cover; and wherein the protrusion is configured to not contact the handle of the filter when the filter has been properly attached to the housing and the user closes the cover.

\* \* \* \* \*